US012764640B2

(12) United States Patent
Yuan et al.

(10) Patent No.: US 12,764,640 B2
(45) Date of Patent: Oct. 13, 2026

(54) ACTIVE BASE STATION ROLE IN USER EQUIPMENT DISCOVERY FOR USER EQUIPMENT COOPERATION

(71) Applicant: QUALCOMM Incorporated, San Diego, CA (US)

(72) Inventors: Fang Yuan, Beijing (CN); Aleksandar Damnjanovic, Del Mar, CA (US); Luanxia Yang, Beijing (CN); Mostafa Khoshnevisan, San Diego, CA (US); Wooseok Nam, San Diego, CA (US); Rajat Prakash, San Diego, CA (US); Tao Luo, San Diego, CA (US); Xiaoxia Zhang, San Diego, CA (US)

(73) Assignee: Qualcomm Incorporated, San Diego, CA (US)

( * ) Notice: Subject to any disclaimer, the term of this patent is extended or adjusted under 35 U.S.C. 154(b) by 257 days.

(21) Appl. No.: 18/580,219

(22) PCT Filed: Sep. 17, 2021

(86) PCT No.: PCT/CN2021/118952
§ 371 (c)(1),
(2) Date: Jan. 18, 2024

(87) PCT Pub. No.: WO2023/039817
PCT Pub. Date: Mar. 23, 2023

(65) Prior Publication Data

US 2024/0397413 A1 Nov. 28, 2024

(51) Int. Cl.
*H04W 48/14* (2009.01)
*H04W 8/00* (2009.01)
(Continued)

(52) U.S. Cl.
CPC ........... *H04W 48/14* (2013.01); *H04W 8/005* (2013.01); *H04W 48/16* (2013.01); *H04W 72/23* (2023.01)

(58) Field of Classification Search
CPC ..... H04W 48/14; H04W 72/23; H04W 8/005; H04W 48/16; H04W 8/22; H04W 88/04
(Continued)

(56) References Cited

U.S. PATENT DOCUMENTS

2011/0258313 A1 10/2011 Mallik et al.
2018/0049260 A1 * 2/2018 Aminaka .............. H04W 76/14
(Continued)

FOREIGN PATENT DOCUMENTS

WO 2011149307 A2 12/2011
WO 2014027732 A1 2/2014
WO 2018016882 A1 1/2018

OTHER PUBLICATIONS

International Search Report and Written Opinion—PCT/CN2021/118952—ISA/EPO—May 25, 2022.
(Continued)

*Primary Examiner* — Xuan Lu
(74) *Attorney, Agent, or Firm* — HARRITY & HARRITY, LLP

(57) ABSTRACT

Wireless communications systems and methods related to UE cooperation are provided. A base station (BS) may assist a UE in discovering and cooperating with other UEs. A BS may collect information from candidate cooperative UEs such as UE capability and availability. This information may be broadcast to other UEs or may be transmitted to a UE at the UE's request. The UE may, upon receipt of this information, use it to aid in discovering the candidate cooperative UEs and/or establishing a connection.

30 Claims, 14 Drawing Sheets

(51) Int. Cl.

*H04W 8/22* (2009.01)
*H04W 48/16* (2009.01)
*H04W 72/23* (2023.01)
*H04W 88/04* (2009.01)

(58) Field of Classification Search

USPC .......................................................... 370/329
See application file for complete search history.

(56) References Cited

U.S. PATENT DOCUMENTS

| | | | | |
|---|---|---|---|---|
| 2019/0020381 | A1 | 1/2019 | Tooher et al. | |
| 2019/0174411 | A1* | 6/2019 | Xu | H04W 52/02 |
| 2019/0349951 | A1* | 11/2019 | Ahmad | H04W 72/543 |
| 2020/0128466 | A1 | 4/2020 | Vutukuri et al. | |
| 2023/0309004 | A1* | 9/2023 | Wei | H04W 48/16 |

OTHER PUBLICATIONS

Kyocera: "Relay Reselection Based on Discovery", 3GPP TSG-RAN WG2 #112-e, R2-2010005, Online, Nov. 2-13, 2020, Section 2, 6 Pages.
Oppo: "Discussion on NR Sidelink Relay UE(re-)Selection", 3GPP TSG-RAN WG2 Meeting #113 bis electronic, R2-2103007, Online, Apr. 12-Apr. 20, 2021, the whole document, pp. 1-5.
Supplementary European Search Report—EP21957102—Search Authority—Munich—Apr. 22, 2025.
Vivo: "Remaining Issues of Sidelink Relay Discovery Procedure", R2-2101181, 3GPP TSG-RAN WG2 Meeting #113e, 3rd Generation Partnership Project, Mobile Competence Centre, 650, Route Des Lucioles, F-06921 Sophia-antipolis Cedex, France, vol. RAN WG2, No. E-Meeting, Jan. 25, 2021-Feb. 5, 2021, Jan. 15, 2021, 4 Pages, XP051974157, p. 3.

* cited by examiner

ACTIVE BASE STATION ROLE IN USER EQUIPMENT DISCOVERY FOR USER EQUIPMENT COOPERATION

CROSS-REFERENCE TO RELATED APPLICATIONS

The present application is a 35 U.S.C. 371 National Phase entry of Patent Cooperation Treaty (PCT) Application No. PCT/CN2021/118952, filed Sep. 17, 2021, which is hereby expressly incorporated herein by reference in its entirety.

TECHNICAL FIELD

This application relates to wireless communication devices, systems, and methods, and more particularly to devices, systems, and methods for facilitating UE cooperation by assisting in UE discovery.

INTRODUCTION

Wireless communications systems are widely deployed to provide various types of communication content such as voice, video, packet data, messaging, broadcast, and so on. These systems may be capable of supporting communication with multiple users by sharing the available system resources (e.g., time, frequency, and power). A wireless multiple-access communications system may include a number of base stations (BSs), each simultaneously supporting communications for multiple communication devices, which may be otherwise known as user equipment (UE). Wireless communication systems are widely deployed to provide various telecommunication services such as telephony, video, data, messaging, and broadcasts. Typical wireless communication systems may employ multiple-access technologies capable of supporting communication with multiple users by sharing available system resources (e.g., bandwidth, transmit power, and/or the like).

A wireless communication network may include a number of base stations (BSs) that can support communication for a number of user equipment (UEs). A user equipment (UE) may communicate with a base station (BS) via the downlink and uplink. In some instances, a UE may further communicate with one or more other UEs via a sidelink communication. In some instances, a sidelink connection between UEs may be used to provide a UE with an indirect communication link to a BS to take advantage of underutilized resources at the UEs and/or BS(s), referred to as UE cooperation. Existing approaches are limited in how UEs may discover and cooperate with each other, due to such issues as different sidelink configurations at different UEs that prevent discovery of each other, separate information exchange between different UEs and a BS, and/or one or more UEs entering power saving mode at cycles unknown to other UEs. Therefore, there exists a need for improved methods of discovering UEs in order to establish UE cooperation.

BRIEF SUMMARY OF SOME EXAMPLES

The following summarizes some aspects of the present disclosure to provide a basic understanding of the discussed technology. This summary is not an extensive overview of all contemplated features of the disclosure and is intended neither to identify key or critical elements of all aspects of the disclosure nor to delineate the scope of any or all aspects of the disclosure. Its sole purpose is to present some concepts of one or more aspects of the disclosure in summary form as a prelude to the more detailed description that is presented later.

According to one aspect of the present disclosure, a method for wireless communication includes receiving, by a user equipment (UE) from a base station (BS), a first information set associated with a candidate cooperative UE; discovering, by the UE, the candidate cooperative UE based on the first information set; connecting, by the UE to the candidate cooperative UE; and communicating, by the UE with the BS, through the candidate cooperative UE.

According to another aspect of the present disclosure, a method for wireless communication includes receiving, by a base station (BS) from a candidate cooperative user equipment (UE), a first information set associated with the candidate cooperative UE; communicating, by the BS to a target UE, at least a portion of the first information set; and receiving, by the BS from the target UE, a cooperative UE update request based on the at least a portion of the first information set.

According to another aspect of the present disclosure, a user equipment (UE) comprises: a transceiver configured to: receive, from a base station (BS), a first information set associated with a candidate cooperative UE; and a processor configured to: discover the candidate cooperative UE based on the first information set; and connect to the candidate cooperative UE, wherein the transceiver is further configured to communicate with the BS through the candidate cooperative UE.

According to another aspect of the present disclosure, a base station (BS) comprises: a transceiver configured to: receive, from a candidate cooperative user equipment (UE), a first information set associated with the candidate cooperative UE; communicate, to a target UE, at least a portion of the first information set; and receive, from the target UE, a cooperative UE update request based on the at least a portion of the first information set.

Other aspects and features aspect of the present invention will become apparent to those of ordinary skill in the art, upon reviewing the following description of specific, exemplary aspects of the present invention in conjunction with the accompanying figures. While features of the present invention may be discussed relative to certain aspects and figures below, all aspects of the present invention can include one or more of the advantageous features discussed herein. In other words, while one or more aspects may be discussed as having certain advantageous features, one or more of such features may also be used in accordance with the various aspects of the invention discussed herein. In similar fashion, while exemplary aspects may be discussed below as device, system, or method aspects it should be understood that such exemplary aspects can be implemented in various devices, systems, and methods.

DETAILED DESCRIPTION

Figure 1:
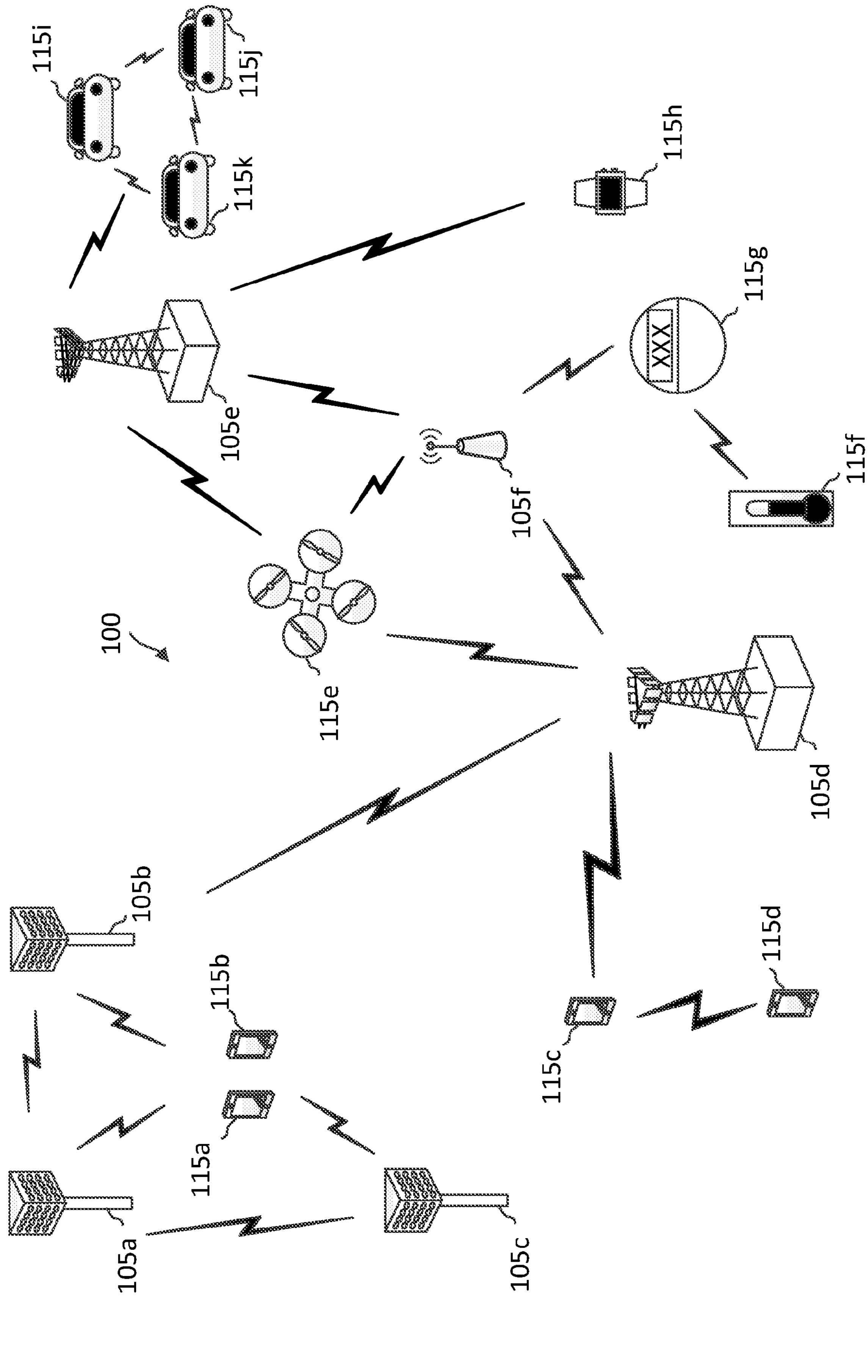
FIG. 1 illustrates a wireless communication network according to some aspects of the present disclosure.

The detailed description set forth below, in connection with the appended drawings, is intended as a description of various configurations and is not intended to represent the only configurations in which the concepts described herein may be practiced. The detailed description includes specific details for the purpose of providing a thorough understanding of the various concepts. However, it will be apparent to those skilled in the art that these concepts may be practiced without these specific details. In some instances, well-known structures and components are shown in block diagram form in order to avoid obscuring such concepts.

This disclosure relates generally to wireless communications systems, also referred to as wireless communications networks. In various aspects, the techniques and apparatus may be used for wireless communication networks such as code division multiple access (CDMA) networks, time division multiple access (TDMA) networks, frequency division multiple access (FDMA) networks, orthogonal FDMA (OFDMA) networks, single-carrier FDMA (SC-FDMA) networks, LTE networks, Global System for Mobile Communications (GSM) networks, 5th Generation (5G) or new radio (NR) networks, as well as other communications networks. As described herein, the terms "networks" and "systems" may be used interchangeably.

An OFDMA network may implement a radio technology such as evolved UTRA (E-UTRA), Institute of Electrical and Electronics Engineers (IEEE) 802.11, IEEE 802.16, IEEE 802.20, flash-OFDM and the like. UTRA, E-UTRA, and GSM are part of universal mobile telecommunication system (UMTS). In particular, long term evolution (LTE) is a release of UMTS that uses E-UTRA. UTRA, E-UTRA, GSM, UMTS and LTE are described in documents provided from an organization named "3rd Generation Partnership Project" (3GPP), and cdma2000 is described in documents from an organization named "3rd Generation Partnership Project 2" (3GPP2). These various radio technologies and standards are known or are being developed. For example, the 3rd Generation Partnership Project (3GPP) is a collaboration between groups of telecommunications associations that aims to define a globally applicable third generation (3G) mobile phone specification. 3GPP long term evolution (LTE) is a 3GPP project which was aimed at improving the UMTS mobile phone standard. The 3GPP may define specifications for the next generation of mobile networks, mobile systems, and mobile devices. The present disclosure is concerned with the evolution of wireless technologies from LTE, 4G, 5G, NR, and beyond, and in particular to the development of UE cooperation.

In some networks, a UE may communicate with one or more other UEs via a sidelink communication. A sidelink connection between UEs may be used to provide a UE with an indirect communication link to a BS, referred to as UE cooperation. Some networks rely on the UEs discovering each other without assistance from a BS. Additionally, once a UE discovers another UE with which it wants to cooperate, it may need additional information in order to successfully connect. It is also desirable that a UE knows which candidate UEs are the best candidates for cooperation, which may be based on a number of criteria.

In some aspects of the present disclosure, a BS may collect information from candidate cooperative UEs. This information may include UE capability, location, link status, availability, configuration information, and others. The information collected by a BS may be broadcasted to a number of UEs which may use the information to discover and cooperate with each other. In some aspects, instead of broadcasting the information a UE may request the information, or a subset of the information, for which it will receive a response from the BS with the requested information.

In some aspects, a BS may assist a UE in both discovering and cooperating with a UE. In other aspects, a UE discovers UEs without BS assistance, but the BS still plays some role in determining which of the discovered UEs is preferred for cooperation, based on characteristics of the candidate UEs. For example, a UE may discover multiple UEs which may potentially be used for cooperative communication with a BS. The UE may send a BS a cooperative UE update request indicating the discovered UEs. The BS in some aspects may collect UL information and/or maximum permissible exposure (MPE) information from the indicated UEs, and use that information to determine which UE or UEs are preferred for cooperation (e.g. the UE with fewer or no MPE issues).

Aspects of the present disclosure provide several benefits. For example, initial information, such as sidelink configurations, which may be needed to set up sidelink communication for UE cooperation may be provided by a BS. A UE may not have access to certain information from a cooperative UE since that cooperative UE may directly communicate that information to a BS. The BS may provide this information, for example maximum permissible exposure (MPE) reports, which may not be able to be exchanged via sidelink. Additionally, a UE may more easily identify suitable times to connect with a cooperative UE which is configured for discontinuous reception (DRX) as the DRX information may be provided by the BS to the UE. BS assistance in cooperation between UEs may result in more complete network resource utilization. By establishing cooperative UE communication, the network may benefit from lower latency, higher throughput communication between a UE and a BS.

Various other aspects and features of the disclosure are further described below. It should be apparent that the teachings herein may be embodied in a wide variety of forms and that any specific structure, function, or both being disclosed herein is merely representative and not limiting. Based on the teachings herein one of an ordinary level of skill in the art should appreciate that an aspect disclosed herein may be implemented independently of any other aspects and that two or more of these aspects may be combined in various ways. For example, an apparatus may be implemented or a method may be practiced using any number of the aspects set forth herein. In addition, such an apparatus may be implemented or such a method may be practiced using other structure, functionality, or structure and functionality in addition to or other than one or more of the aspects set forth herein. For example, a method may be implemented as part of a system, device, apparatus, and/or as instructions stored on a computer readable medium for execution on a processor or computer.

FIG. 1 illustrates a wireless communication network 100 according to some aspects of the present disclosure. The network 100 may be a 5G network, an LTE network, or any suitable cellular network and/or combinations thereof. The network 100 includes a number of base stations (BSs) 105 (individually labeled as 105*a*, 105*b*, 105*c*, 105*d*, 105*e*, and 105*f*) and other network entities. A BS 105 may be a station that communicates with UEs 115 and may also be referred to as an evolved node B (eNB), a next generation eNB (gNB), an access point, and the like. Each BS 105 may provide communication coverage for a particular geographic area. In 3GPP, the term "cell" can refer to this particular geographic coverage area of a BS 105 and/or a BS subsystem serving the coverage area, depending on the context in which the term is used.

A BS 105 may provide communication coverage for a macro cell or a small cell, such as a pico cell or a femto cell, and/or other types of cell. A macro cell generally covers a relatively large geographic area (e.g., several kilometers in radius) and may allow unrestricted access by UEs with service subscriptions with the network provider. A small cell, such as a pico cell, would generally cover a relatively smaller geographic area and may allow unrestricted access by UEs with service subscriptions with the network provider. A small cell, such as a femto cell, would also generally cover a relatively small geographic area (e.g., a home) and, in addition to unrestricted access, may also provide restricted access by UEs having an association with the femto cell (e.g., UEs in a closed subscriber group (CSG), UEs for users in the home, and the like). A BS for a macro cell may be referred to as a macro BS. A BS for a small cell may be referred to as a small cell BS, a pico BS, a femto BS or a home BS. In the example shown in FIG. 1, the BSs 105*d* and 105*e* may be regular macro BSs, while the BSs 105*a*-105*c* may be macro BSs enabled with one of three dimension (3D), full dimension (FD), or massive MIMO. The BSs 105*a*-105*c* may take advantage of their higher dimension MIMO capabilities to exploit 3D beamforming in both elevation and azimuth beamforming to increase coverage and capacity. The BS 105*f* may be a small cell BS which may be a home node or portable access point. A BS 105 may support one or multiple (e.g., two, three, four, and the like) cells.

The network 100 may support synchronous or asynchronous operation. For synchronous operation, the BSs may have similar frame timing, and transmissions from different BSs may be approximately aligned in time. For asynchronous operation, the BSs may have different frame timing, and transmissions from different BSs may not be aligned in time.

The UEs 115 are dispersed throughout the wireless network 100, and each UE 115 may be stationary or mobile. A UE 115 may also be referred to as a terminal, a mobile station, a subscriber unit, a station, or the like. A UE 115 may be a cellular phone, a personal digital assistant (PDA), a wireless modem, a wireless communication device, a handheld device, a tablet computer, a laptop computer, a cordless phone, a wireless local loop (WLL) station, or the like. In one aspect, a UE 115 may be a device that includes a Universal Integrated Circuit Card (UICC). In another aspect, a UE may be a device that does not include a UICC. In some aspects, the UEs 115 that do not include UICCs may also be referred to as IoT devices or internet of everything (IoE) devices. The UEs 115*a*-115*d* are examples of mobile smart phone-type devices accessing network 100. A UE 115 may also be a machine specifically configured for connected communication, including machine type communication (MTC), enhanced MTC (eMTC), narrowband IoT (NB-IoT) and the like. The UEs 115*e*-115*h* are examples of various machines configured for communication that access the network 100. The UEs 115*i*-115*k* are examples of vehicles equipped with wireless communication devices configured for sidelink communication, and for access to the network 100. A UE 115 may be able to communicate with other UEs 115 or wireless nodes, or any type of the BSs, whether macro BS, small cell, or the like. In FIG. 1, a lightning bolt (e.g., communication links) indicates wireless transmissions between a UE 115 and a serving BS 105, which is a BS designated to serve the UE 115 on the downlink (DL) and/or uplink (UL), desired transmission between BSs 105, backhaul transmissions between BSs, or sidelink transmissions between UEs 115.

In operation, the BSs 105*a*-105*c* may serve the UEs 115*a* and 115*b* using 3D beamforming and coordinated spatial techniques, such as coordinated multipoint (CoMP) or multi-connectivity. The macro BS 105*d* may perform backhaul communications with the BSs 105*a*-105*c*, as well as small cell, the BS 105*f*. The macro BS 105*d* may also transmits multicast services which are subscribed to and received by the UEs 115*c* and 115*d*. Such multicast services may include mobile television or stream video, or may include other services for providing community information, such as weather emergencies or alerts, such as Amber alerts or gray alerts.

The BSs 105 may also communicate with a core network. The core network may provide user authentication, access authorization, tracking, Internet Protocol (IP) connectivity, and other access, routing, or mobility functions. At least some of the BSs 105 (e.g., which may be an example of a gNB or an access node controller (ANC)) may interface with the core network through backhaul links (e.g., NG-C, NG-U, etc.) and may perform radio configuration and scheduling for communication with the UEs 115. In various examples, the BSs 105 may communicate, either directly or indirectly (e.g., through core network), with each other over backhaul links (e.g., X1, X2, etc.), which may be wired or wireless communication links.

The network 100 may also support mission critical communications with ultra-reliable and redundant links for mission critical devices, such as the UE 115*e*, which may be a drone. Redundant communication links with the UE 115*e* may include links from the macro BSs 105*d* and 105*e*, as well as links from the small cell BS 105*f*. Other machine type devices, such as the UE 115*f* (e.g., a thermometer), the UE 115*g* (e.g., smart meter), and UE 115*h* (e.g., wearable device) may communicate through the network 100 either directly with BSs, such as the small cell BS 105*f*, and the macro BS 105*e*, or in multi-step-size configurations by communicating with another user device which relays its information to the network, such as the UE 115*f* communicating temperature measurement information to the smart meter, the UE 115*g*, which is then reported to the network through the small cell BS 105*f*. The network 100 may also provide additional network efficiency through dynamic, low-latency TDD/FDD communications, such as V2V, V2X, V2P, and/or C-V2X communications between a UE 115*i*, 115*j*, or 115*k* and other UEs 115, and/or vehicle-to-infrastructure (V2I) communications between a UE 115*i*, 115*j*, or 115*k* and one or more other wireless nodes, including through the use of sidelink communications in accordance with the present disclosure.

In some implementations, the network 100 utilizes OFDM-based waveforms for communications. An OFDM-based system may partition the system BW into multiple (K)

orthogonal subcarriers, which are also commonly referred to as subcarriers, tones, bins, or the like. Each subcarrier may be modulated with data. In some instances, the subcarrier spacing between adjacent subcarriers may be fixed, and the total number of subcarriers (K) may be dependent on the system BW. The system BW may also be partitioned into subbands. In other instances, the subcarrier spacing and/or the duration of TTIs may be scalable.

In some aspects, the BSs 105 (or UEs 115 or other wireless nodes, in sidelink communication scenarios) can assign or schedule transmission resources (e.g., in the form of time-frequency resource blocks (RB)) for downlink (DL) and uplink (UL) transmissions (or sidelink transmissions). DL may refer to the transmission direction from a BS 105 to a UE 115, whereas UL may refer to the transmission direction from a UE 115 to a BS 105. The communication can be in the form of radio frames. A radio frame may be divided into a plurality of subframes or slots, for example, about 10. Each slot may be further divided into mini-slots. In a FDD mode, simultaneous UL and DL transmissions may occur in different frequency bands. For example, each subframe includes a UL subframe in a UL frequency band and a DL subframe in a DL frequency band. In a TDD mode, UL and DL transmissions occur at different time periods using the same frequency band. For example, a subset of the subframes (e.g., DL subframes) in a radio frame may be used for DL transmissions and another subset of the subframes (e.g., UL subframes) in the radio frame may be used for UL transmissions.

The DL subframes and the UL subframes can be further divided into several regions. For example, each DL or UL subframe may have pre-defined regions for transmissions of reference signals, control information, and data. Reference signals are predetermined signals that facilitate the communications between the BSs 105 and the UEs 115. For example, a reference signal can have a particular pilot pattern or structure, where pilot tones may span across an operational BW or frequency band, each positioned at a pre-defined time and a pre-defined frequency. For example, a BS 105 may transmit cell specific reference signals (CRSs) and/or channel state information-reference signals (CSI-RSs) to enable a UE 115 to estimate a DL channel. Similarly, a UE 115 may transmit sounding reference signals (SRSs) to enable a BS 105 (or another UE or wireless node) to estimate a UL channel (or sidelink channel). Control information may include resource assignments and protocol controls. Data may include protocol data and/or operational data. In some aspects, the BSs 105 and the UEs 115 may communicate using self-contained subframes. A self-contained subframe may include a portion for DL communication and a portion for UL communication. A self-contained subframe can be DL-centric or UL-centric. A DL-centric subframe may include a longer duration for DL communication than for UL communication. A UL-centric subframe may include a longer duration for UL communication than for UL communication.

In some aspects, the network 100 may be an NR network deployed over a licensed spectrum. In some other aspects, the wireless communications system 100 may utilize both licensed and unlicensed radio frequency spectrum bands. For example, the wireless communications system 100 may employ License Assisted Access (LAA), LTE-Unlicensed (LTE-U) radio access technology, or NR technology in an unlicensed band such as the 5 GHz industrial, scientific, and medical (ISM) band. When operating in unlicensed radio frequency spectrum bands, devices such as the BSs 105 and the UEs 115 may employ carrier sensing for collision detection and avoidance. In some examples, operations in unlicensed bands may be based on a carrier aggregation configuration in conjunction with component carriers operating in a licensed band (e.g., LAA). Operations in unlicensed spectrum may include downlink transmissions, uplink transmissions, P2P transmissions, or D2D transmissions (e.g., sidelink communications), among other examples.

The BSs 105 (or UEs 115 in sidelink communication) can transmit synchronization signals (e.g., including a primary synchronization signal (PSS) and a secondary synchronization signal (SSS)) in the network 100 to facilitate synchronization. The BSs 105 can broadcast system information associated with the network 100 (e.g., including a master information block (MIB), remaining system information (RMSI), and other system information (OSI)) to facilitate initial network access. In some instances, the BSs 105 may broadcast the PSS, the SSS, and/or the MIB in the form of synchronization signal block (SSBs) over a physical broadcast channel (PBCH) and may broadcast the RMSI and/or the OSI over a physical downlink shared channel (PDSCH).

In some aspects, a UE 115 attempting to access the network 100 may perform an initial cell search by detecting a PSS from a BS 105 or from another wireless node in the network (e.g., another UE 115 in sidelink communication). The PSS may enable synchronization of period timing and may indicate a physical layer identity value. The UE 115 may then receive a SSS. The SSS may enable radio frame synchronization, and may provide a cell identity value, which may be combined with the physical layer identity value to identify the cell. The PSS and the SSS may be located in a central portion of a carrier or any suitable frequencies within the carrier.

After receiving the PSS and SSS, the UE 115 may receive a MIB. The MIB may include system information for initial network access and scheduling information for RMSI and/or OSI. After decoding the MIB, the UE 115 may receive RMSI and/or OSI. The RMSI and/or OSI may include radio resource control (RRC) information related to random access channel (RACH) procedures, paging, control resource set (CORESET) for physical downlink control channel (PDCCH) monitoring, physical UL control channel (PUCCH), physical UL shared channel (PUSCH), power control, and SRS.

After obtaining the MIB, the RMSI and/or the OSI, the UE 115 can perform a random access procedure to establish a connection with the BS 105. In some examples, the random access procedure may be a four-step random access procedure. For example, the UE 115 may transmit a random access preamble and the BS 105 may respond with a random access response. The random access response (RAR) may include a detected random access preamble identifier (ID) corresponding to the random access preamble, timing advance (TA) information, a UL grant, a temporary cell-radio network temporary identifier (C-RNTI), and/or a back-off indicator. Upon receiving the random access response, the UE 115 may transmit a connection request to the BS 105 and the BS 105 may respond with a connection response. The connection response may indicate a contention resolution. In some examples, the random access preamble, the RAR, the connection request, and the connection response can be referred to as message 1 (MSG1), message 2 (MSG2), message 3 (MSG3), and message 4 (MSG4), respectively. In some examples, the random access procedure may be a two-step random access procedure, where the UE 115 may transmit a random access preamble and a connection request in a single transmission and the BS 105 may respond by transmitting a random access response and a connection response in a single transmission.

After establishing a connection, the UE 115 and the BS 105 can enter a normal operation stage, where operational data may be exchanged. For example, the BS 105 may schedule the UE 115 for UL and/or DL communications. The BS 105 may transmit UL and/or DL scheduling grants to the UE 115 via a PDCCH. The scheduling grants may be transmitted in the form of DL control information (DCI). The BS 105 may transmit a DL communication signal (e.g., carrying data) to the UE 115 via a PDSCH according to a DL scheduling grant. The UE 115 may transmit a UL communication signal to the BS 105 via a PUSCH and/or PUCCH according to a UL scheduling grant.

In some aspects, the BS 105 may communicate with a UE 115 using HARQ techniques to improve communication reliability, for example, to provide a URLLC service. The BS 105 may schedule a UE 115 for a PDSCH communication by transmitting a DL grant in a PDCCH. The BS 105 may transmit a DL data packet to the UE 115 according to the schedule in the PDSCH. The DL data packet may be transmitted in the form of a transport block (TB). If the UE 115 receives the DL data packet successfully, the UE 115 may transmit a HARQ ACK to the BS 105. Conversely, if the UE 115 fails to receive the DL transmission successfully, the UE 115 may transmit a HARQ NACK to the BS 105. Upon receiving a HARQ NACK from the UE 115, the BS 105 may retransmit the DL data packet to the UE 115. The retransmission may include the same coded version of DL data as the initial transmission. Alternatively, the retransmission may include a different coded version of the DL data than the initial transmission. The UE 115 may apply soft-combining to combine the encoded data received from the initial transmission and the retransmission for decoding. The BS 105 and the UE 115 may also apply HARQ for UL communications using substantially similar mechanisms as the DL HARQ.

In some aspects, the network 100 may operate over a system BW or a component carrier (CC) BW. The network 100 may partition the system BW into multiple BWPs (e.g., portions). A BS 105 may dynamically assign a UE 115 to operate over a certain BWP (e.g., a certain portion of the system BW). The assigned BWP may be referred to as the active BWP. The UE 115 may monitor the active BWP for signaling information from the BS 105. The BS 105 may schedule the UE 115 for UL or DL communications in the active BWP. In some aspects, a BS 105 may assign a pair of BWPs within the CC to a UE 115 for UL and DL communications. For example, the BWP pair may include one BWP for UL communications and one BWP for DL communications.

Although much of the description of the network 100 above is in the context of communication between UEs 115 and BSs 105, it will be understood that the mechanisms, elements, structures, and protocols described above can be performed between UEs 115 or wireless nodes in a sidelink communication scenario. For example, in some aspects, the radio frame structures, channels, signals, scheduling procedures, and/or connection techniques (e.g., HARQ) may be performed between UEs 115/wireless nodes, rather than between a BS 105 and a UE 115.

Sidelink communications refers to the communications among user equipment devices (e.g., UEs 115*i*, 115*j*, 115*k*) without tunneling through a BS 105 and/or a core network. Sidelink communication can be communicated over a physical sidelink control channel (PSCCH) and a physical sidelink shared channel (PSSCH). The PSCCH and PSSCH are analogous to a physical downlink control channel (PDCCH) and a physical downlink shared channel (PDSCH) in downlink (DL) communication between a BS 105 and a UE 115, as described above. For instance, the PSCCH may carry sidelink control information (SCI) and the PSSCH may carry sidelink data (e.g., user data). Each PSCCH is associated with a corresponding PSSCH, where SCI in a PSCCH may carry reservation and/or scheduling information for sidelink data transmission in the associated PSSCH.

By utilizing sidelink communication, a UE 115 may communicate with another UE 115 independent of BS 105, and/or cooperate with another UE 115 to communicate with a BS 105. For example, the UEs 115 may communicate via a cooperate sidelink using unlicensed spectrum, which may ensure all licensed spectrum remains available to the network 100 (while, in other examples, licensed or a combination of licensed and unlicensed spectrum may be used). In this way network resources may be more fully utilized, and a UE 115 which has trouble reliably communicating with a BS 105 may use its resources to communicate via the cooperative UE 115 which may be a more reliable link.

A BS 105 may use multiple antennas or antenna arrays (e.g., antenna panels) to conduct beamforming operations for directional communications with a UE 115. Some signals (e.g., synchronization signals, reference signals, beam selection signals, or other control signals) may be transmitted by a BS 105 multiple times in different directions. For example, the BS 105 may transmit a signal according to different beamforming weight sets associated with different directions of transmission. Transmissions in different beam directions may be used to identify (e.g., by a transmitting device, such as a BS 105, or by a receiving device, such as UE 115) a beam direction for later transmission or reception by the BS 105. Some signals may be transmitted in a single beam direction (e.g., data associated with a particular receiving device). In some examples, the beam direction associated with transmissions along a single beam direction may be determined based on a signal that was transmitted in one or more beam directions. For example, a UE 115 may receive one or more of the signals transmitted by the BS 105 in different directions and may report to the BS 105 an indication of the signal that the UE 115 received with a highest signal quality or an otherwise acceptable signal quality.

In some examples, transmissions by a device (e.g., by a BS 105 or a UE 115) may be performed using multiple beam directions, and the device may use a combination of digital precoding or radio frequency beamforming to generate a combined beam for transmission (e.g., from a BS 105 to a UE 115). The UE 115 may report feedback that indicates precoding weights for one or more beam directions, and the feedback may correspond to a configured number of beams across a system bandwidth or one or more sub-bands. The BS 105 may transmit a reference signal (e.g., a CRS), a CSI-RS, etc.), which may be precoded or unprecoded. The UE 115 may provide feedback for beam selection, which may be a precoding matrix indicator (PMI) or codebook-based feedback (e.g., a multi-panel type codebook, a linear combination type codebook, a port selection type codebook). Although these techniques are described with reference to signals transmitted in one or more directions by a BS 105, a UE 115 may employ similar techniques for transmitting signals multiple times in different directions (e.g., for identifying a beam direction for subsequent transmission or reception by the UE 115) or for transmitting a signal in a single direction (e.g., for transmitting data to a receiving device).

A receiving device (e.g., a UE 115) may try multiple receive configurations (e.g., directional listening) when receiving various signals from the BS 105, such as synchronization signals, reference signals, beam selection signals, or other control signals. For example, a receiving device may try multiple receive directions by receiving via different antenna subarrays, by processing received signals according to different antenna subarrays, by receiving according to different receive beamforming weight sets (e.g., different directional listening weight sets) applied to signals received at multiple antenna elements of an antenna array, or by processing received signals according to different receive beamforming weight sets applied to signals received at multiple antenna elements of an antenna array, any of which may be referred to as "listening" according to different receive configurations or receive directions. In some examples, a receiving device may use a single receive configuration to receive along a single beam direction (e.g., when receiving a data signal). The single receive configuration may be aligned in a beam direction determined based on listening according to different receive configuration directions (e.g., a beam direction determined to have a highest signal strength, highest signal-to-noise ratio (SNR), or otherwise acceptable signal quality based on listening according to multiple beam directions).

Utilizing sidelink communications can enable UEs 115 to cooperate together to communicate with a BS 105 as a single entity (e.g., a single RRC entity). From the BS 105 perspective, when UE cooperation is implemented the BS 105 may consider multiple antenna panels associated with different UEs 115 to be a part of the same virtual UE (also may be referred to as a distributed unit, single entity, or disaggregated UE). The virtual UE may be configured as a single RRC entity. In such a configuration, the network may not care which UE 115 a communication is being received from or transmitted to, but instead may recognize communications as coming from or being sent to a single entity.

The two or more UEs 115 may communicate via sidelink communication links to transfer the information received from the BS 105, and/or to be transmitted to the BS 105, between one another. For example, a BS 105 may transmit a message to an antenna panel of a first UE 115 although the message is intended for a second UE 115 (e.g., a target UE). The process of communicating the information may be referred to as UE cooperation. For example, the first UE 115 may recognize that the received message is intended for the second UE 115 and may transmit or relay the message to the second UE 115 via a sidelink. As will be discussed in more detail with respect for FIGS. 2-14, a BS may assist a target UE in discovering and/or cooperating with another UE 115. For example, a BS 105 may collect information from candidate cooperative UEs 115. This information may include UE capability, location, link status, availability, configuration information, and others. The information collected by a BS 105 may be broadcasted to a number of UEs 115, which may in turn use the information to discover and cooperate with each other. In some aspects, instead of broadcasting the information a UE 115 may request some or all of the information from the BS 105, to which the BS 105 will respond with the requested information. Further aspects are discussed below.

In some aspects, a BS 105 may assist a UE 115 in both discovering and cooperating with another UE 115. In other aspects, a UE 115 discovers UEs 115 without BS 105 assistance, but the BS 105 still plays some role in determining which of the discovered UEs 115 is preferred for cooperation, based on characteristics of the candidate UEs 115. For example, a UE 115 may discover multiple UEs 115 which may potentially be used for cooperative communication with a BS 105. The UE 115 may send a BS 105 a cooperative UE update request indicating the discovered UEs 115. The BS 105 in some aspects may collect UL information and/or MPE information from the indicated UEs 115, and use that information to determine which UE 115 or UEs 115 are preferred for cooperation (e.g. the UE 115 with fewer or no MPE issues).

Figure 2A:
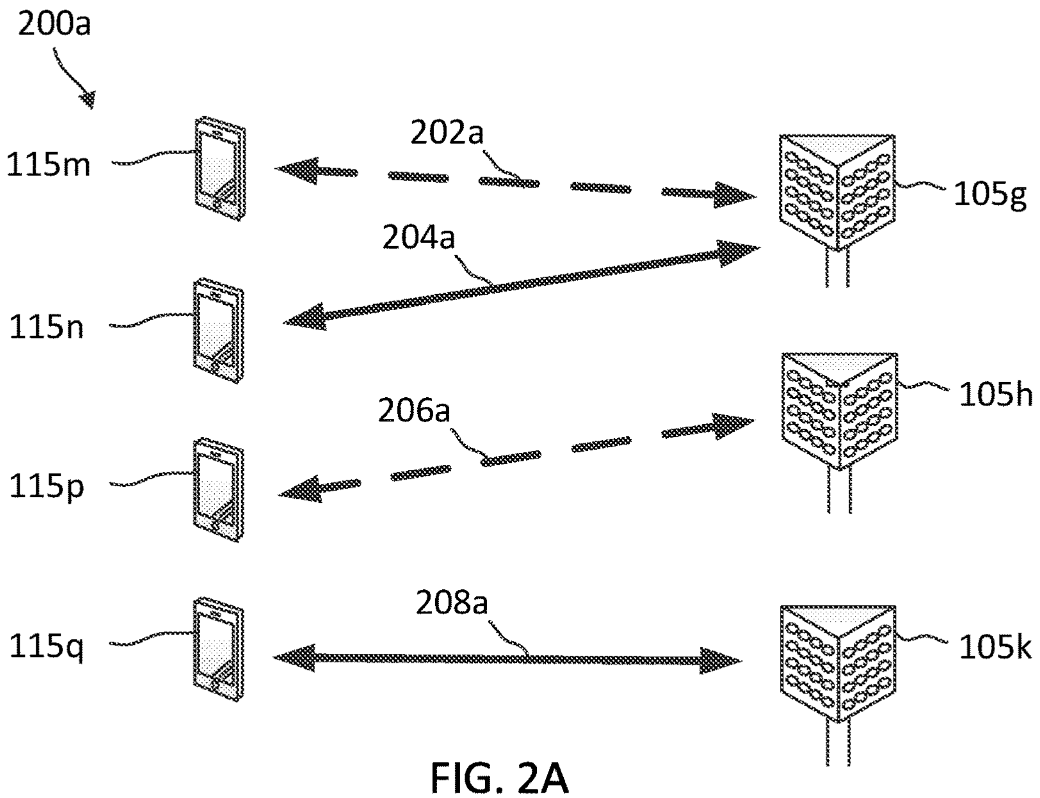
FIG. 2A is a diagram illustrating a network with UEs operating without cooperation according to some aspects of the present disclosure.

FIG. 2A is a diagram illustrating a network 200*a* with UEs 115 operating without cooperation. In the illustrated example, BS 105*g* communicates with UE 115*n* via communication channel 204*a*. The communication channel 202*a* between BS 105*g* and UE 115*m* is unutilized (indicated by the dashed line), as UE 115*m* is attached but not actively communicating with BS 105*g*. Similarly, communication channel 206*a* is unutilized as UE 115*p* is not actively communicating with BS 105*h*. Finally, communication channel 208*a* is being used for communication between UE 115*q* and BS 105*k*. The unutilized communication channels 202*a* and 206*a* illustrate that network 200*a* is not fully utilizing its resources. As a result of the idle channels, the active UEs 115*n* and 115*q* are not able to take advantage of all spatial dimensions available in the network 200*a* (e.g., at least those spatial dimensions associated with unutilized channels 202*a* and 206*a*), and potentially are not utilizing their full RF capability (e.g., antennas), which may limit their communication throughput than would otherwise be available.

Figure 2B:
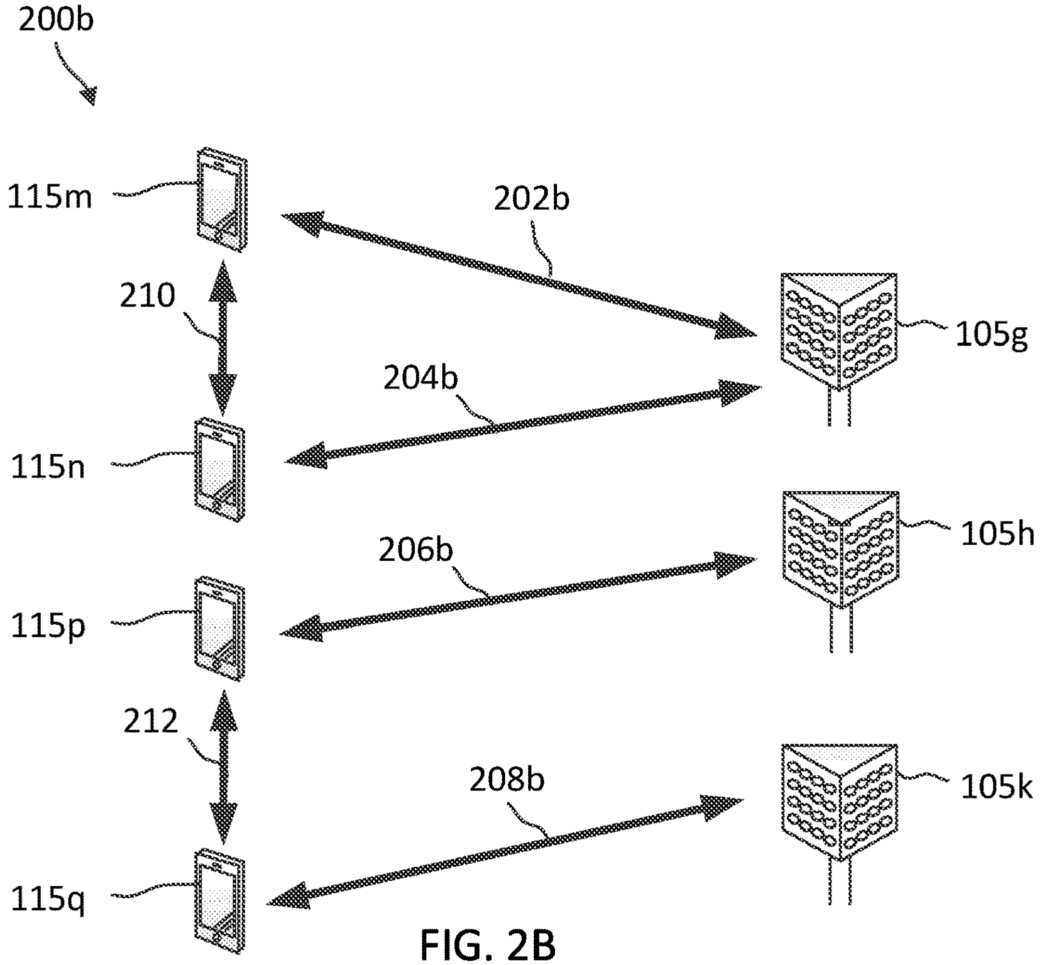
FIG. 2B is a diagram illustrating a network with UEs operating with cooperation according to some aspects of the present disclosure.

FIG. 2B is a diagram illustrating a network 200*b* with UEs 115 operating in cooperation with each other to communicate with one or more BSs 105. In contrast to network 200*a*, the resources of the network 200*b* are more fully utilized, by virtue of the UE cooperation. Active UE 115*n* may communicate with BS 105*g* using communication channel 204*b*. In addition, UE 115*n* may communicate via sidelink communication channel 210 (to UE 115*m*) to BS 105*g*. As UE 115*m* is not using communication channel 202*b* itself (between UE 115*m* and BS 105*g*), the UE 115*m* may use channel 202*b* to communicate with BS 105*g* on behalf of UE 115*n*. In contrast to communication channel 202*a* (FIG. 2A) that was unutilized in network 200*a*, communication channel 202*b* is utilized in network 200*b*, more fully realizing the capability of the network 200*b*. As another example, UE 115*q* may take advantage of unused capacity to communicate with the network 200*b* by indirectly communicating with BS 105*h* by communicating with UE 115*p* via sidelink communication channel 212 and UE 115*p* in turn communicating with BS 105*h* via communication channel 206*b* (relaying the information received via sidelink 212 from UE 115*q*). UE 115*q* may also directly communicate with BS 105*k* via communication channel 208*b*.

As these examples illustrate, UE cooperation may be used to increase throughput between a UE 115 and a single BS 105, or it may increase the throughput of a UE 115 by utilizing one or more additional BSs 105. For example, UE 115*q* may communicate (directly or indirectly) with BS 105*h* and BS 105*k*, and UE 115*n* may communicate (directly or indirectly) with BS 105*g*, both using cooperative UEs 115. Such cooperation may be useful in various scenarios. For example, while a UE such as UE 115*n* may have multiple antenna panels which could potentially be used to communicate via multiple channels simultaneously with BS 105*g*, there may be issues (such as maximum permissible exposure (MPE) discussed below with reference to FIG. 3 below) which cause UE 115*n* to not be able to use all of its resources to communicate with BS 105*g* without cooperatively communicating with another UE 115 such as UE 115*m*.

Figure 3:
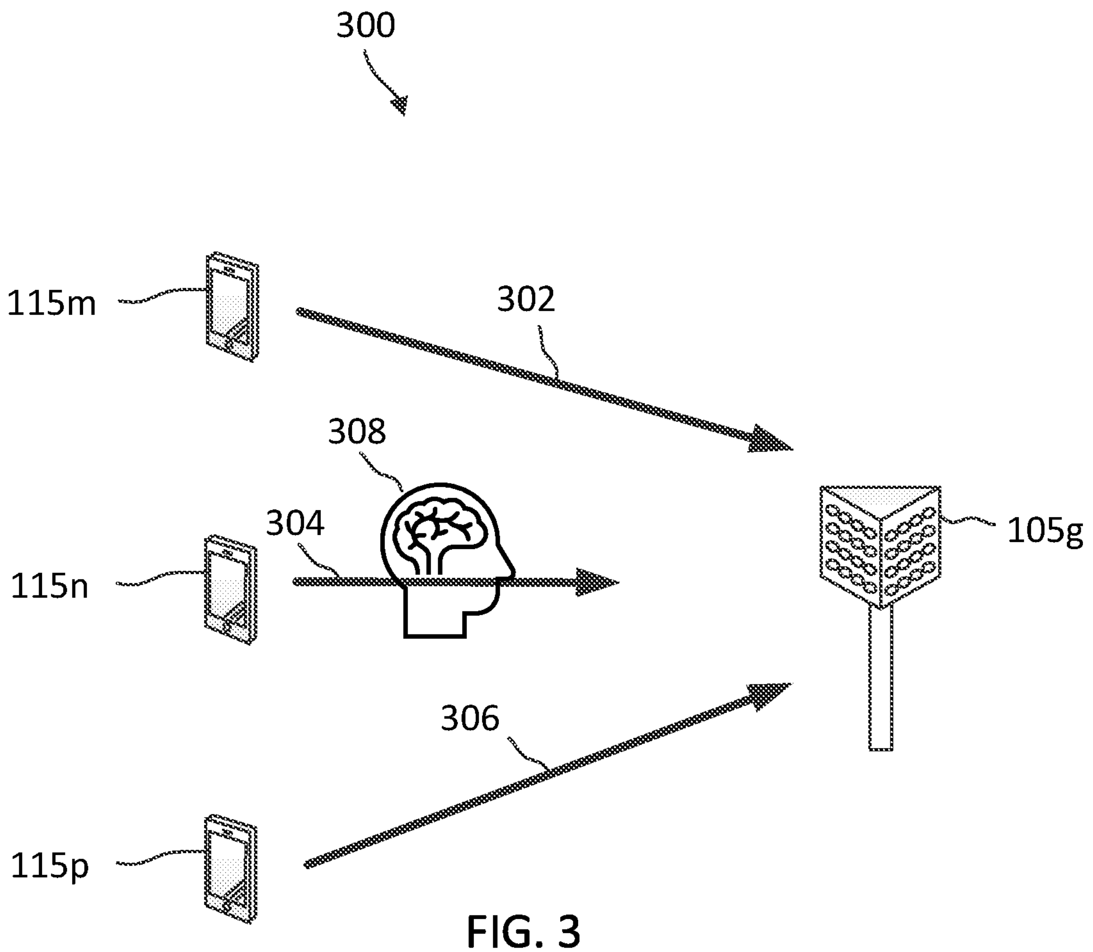
FIG. 3 illustrates a maximum permissible exposure scenario according to some aspects of the present disclosure.

FIG. 3 is a diagram of a network 300 which illustrates a maximum permissible exposure (MPE) scenario. This is an example of a scenario in which it would be beneficial for a BS 105 to assist a UE 115 in cooperation, even when the UE 115 is able to discover other UEs 115 without BS 105 assistance. UEs 115*m*, 115*n*, and 115*p* communicate with BS 105*g* in this illustrated example using, respectively, communication channels 302, 304, and 306. User 308 may be in an area such that UE 115*n* must limit the power density output of its antennas to not surpass an MPE threshold. As such, if UE 115*n* would need to exceed that threshold in order to communicate with BS 105*g* via channel 304, then UE 115*n* may report a MPE event to BS 105*g* and request UE cooperation to relay UL data by cooperation with another UE 115. In some aspects, UE 115*n* may discover UEs 115*m* and 115*p*, and identify them to BS 105*g* as candidate cooperative UEs 115. In other aspects, BS 105*g* may assist UE 115*n* in discovering UE 115*m* and/or UE 115*p*. BS 105*g* may consider uplink measurements and/or MPE reports of the other UEs 115*m* and 115*p*, in order to select a better cooperative UE set, or BS 105*g* may send the UL information and/or MPE reports to UE 115*n*. UE 115*n* may then establish cooperative communication with either UE 115*m* or UE 115*p* or both in order to more reliably communicate with BS 105*g* and mitigate further MPE events. A similar method for BS assistance in UE cooperation is discussed with reference to FIG. 14.

Figure 4:
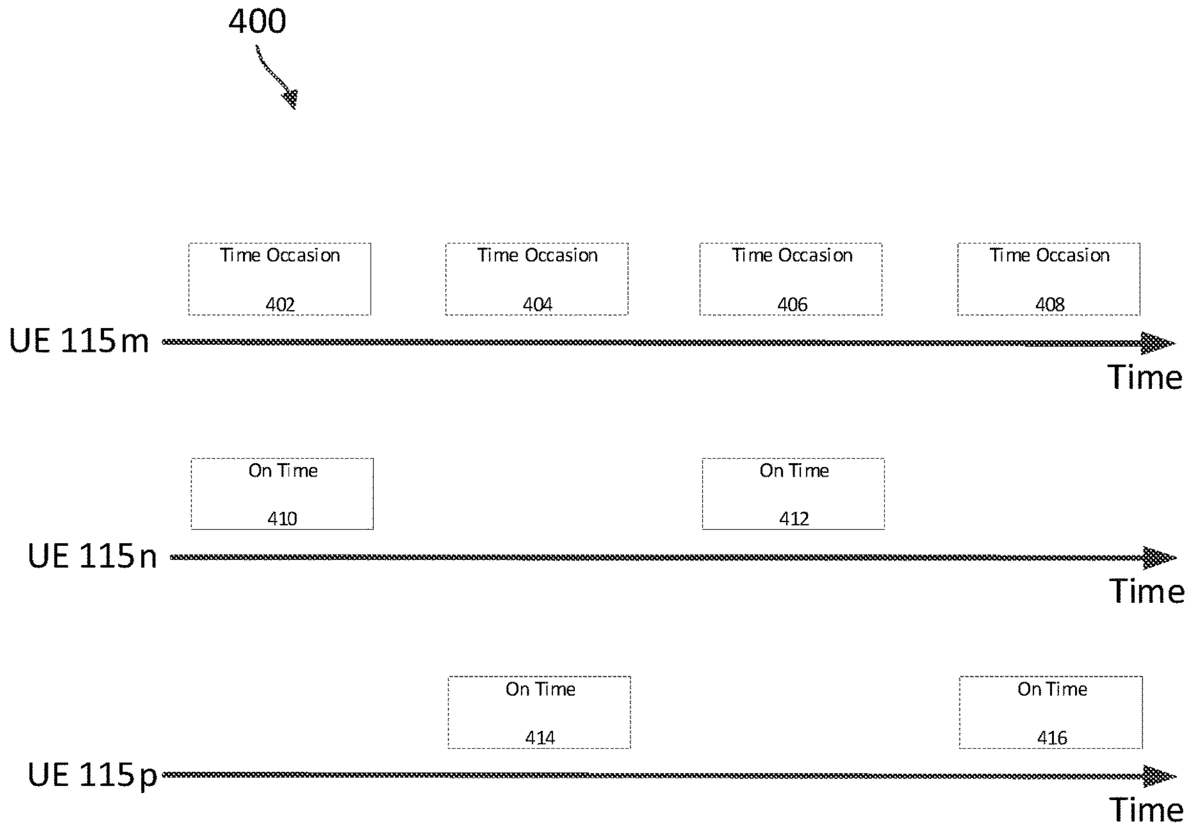
FIG. 4 is a timing diagram illustrating UE cooperation availability among UEs according to some aspects of the present disclosure.

FIG. 4 is a timing diagram 400 illustrating UE cooperation availability among UEs 115. The top row shows time occasions 402, 404, 406, and 408 for UE 115*m*. These time occasions represent times which UE 115*m* may be able to attempt to cooperate with another UE 115. The other rows show when UE 115*n* and UE 115*p* are respectively active (e.g., according to their respective discontinuous reception (DRX) cycles that are illustrated in FIG. 4 as different from each other), as represented by on time 410 and on time 412 for UE 115*n* and on time 414 and on time 416 for UE 115*p*, with the other periods of time corresponding to an "off" period for the respective UEs 115. When a UE 115 such as UE 115*n* is on (e.g., on time 410 and 412), it may communicate with a BS for itself, and therefore may not be available for use as a cooperative UE 115 to a target UE 115. When UE 115*n* or UE 115*p* is not on, it may still be RRC active (with a correspondingly available connection), and therefore potentially available for cooperation.

Without being aware of the schedule for UE 115*n* and UE 115*p*, however, UE 115*m* may not know when each UE 115 is available for cooperation. According to aspects of the present disclosure, such availability information may be communicated by a BS (e.g., BS 105 of FIG. 1) to UE 115*m* so that it may make decisions about UE cooperation based on the provided availability information, including the UE 115*m* being able to decide which on times to use in an attempt to discover and establish sidelink communication with UE 115*n* or UE 115*p*. In the example of diagram 400, UE 115*m* may use UE 115*n* for cooperation during time occasions 404 and 408, and may use UE 115*p* for cooperation during time occasions 402 and 406. In some other aspects, the BS (e.g., BS 105 of FIG. 1) may use the availability information to determine for UE 115*m* which UE is preferable for UE cooperation, and instruct UE 115*m* accordingly. The systems and methods by which such information and other information may be communicated and used is further described below with reference to FIGS. 5-14.

Figure 5:
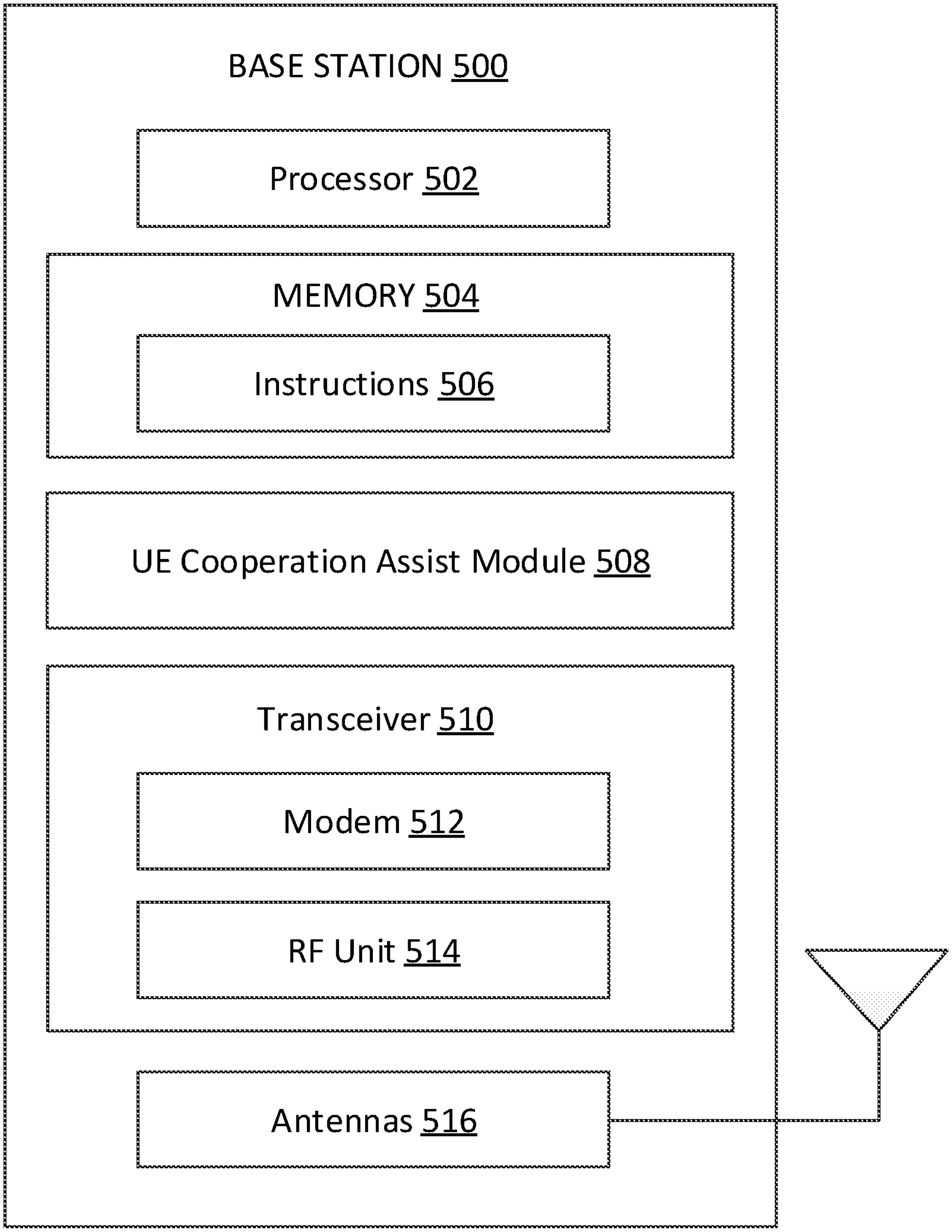
FIG. 5 is a block diagram of an exemplary base station according to some aspects of the present disclosure.

FIG. 5 is a block diagram of an exemplary BS 500 according to some aspects of the present disclosure. In some instances, the BS 500 may be a BS 105 in the network 100 as discussed above in FIG. 1. In some other instances, the BS 500 may be a BS 105*g*, BS 105*h*, and/or BS 105*k* discussed above with reference to FIGS. 2-3. A TRP may implement at least RF functionalities, but may also implement some baseband processing and/or protocol stack layer processing similar to a BS 105. As shown, the BS 500 may include a processor 502, a memory 504, a UE cooperation assist module 508, a transceiver 510 including a modem subsystem 512 and a RF unit 514, and one or more antennas 516. These elements may be coupled with one another. The term "coupled" may refer to directly or indirectly coupled or connected to one or more intervening elements. For instance, these elements may be in direct or indirect communication with each other, for example via one or more buses.

The processor 502 may have various features as a specific-type processor. For example, these may include a CPU, a DSP, an ASIC, a controller, a FPGA device, another hardware device, a firmware device, or any combination thereof configured to perform the operations described herein. The processor 502 may also be implemented as a combination of computing devices, e.g., a combination of a DSP and a microprocessor, a plurality of microprocessors, one or more microprocessors in conjunction with a DSP core, or any other such configuration.

The memory 504 may include a cache memory (e.g., a cache memory of the processor 502), RAM, MRAM, ROM, PROM, EPROM, EEPROM, flash memory, a solid state memory device, one or more hard disk drives, memristor-based arrays, other forms of volatile and non-volatile memory, or a combination of different types of memory. In some aspects, the memory 504 may include a non-transitory computer-readable medium. The memory 504 may store instructions 506. The instructions 506 may include instructions that, when executed by the processor 502, cause the processor 502 to perform operations described herein, for example, aspects of FIGS. 1-4 and 7-14. Instructions 506 may also be referred to as program code. The program code may be for causing a wireless communication device to perform these operations, for example by causing one or more processors (such as processor 502) to control or command the wireless communication device to do so. The terms "instructions" and "code" should be interpreted broadly to include any type of computer-readable statement(s). For example, the terms "instructions" and "code" may refer to one or more programs, routines, sub-routines, functions, procedures, etc. "Instructions" and "code" may include a single computer-readable statement or many computer-readable statements.

The UE cooperation assist module 508 may perform functions described with reference to the other figures herein. The UE cooperation assist module 508 may collect information sets from candidate cooperative UEs 115, as well as cause the BS 500 to send some or all of the collected information sets (and some or all of the contents therein) to one or more target UEs 115. Providing this information to the one or more UEs 115 assists the UEs 115 in discovering and/or cooperating with the candidate cooperative UEs to communicate with the BS 500 (and/or other BSs 500). As discussed herein, an information set for a given UE (e.g., UE 115 of FIG. 1) may include any of a number of pieces of information associated with the candidate cooperative UEs 115.

For example, an information set may include UE capability available for UE cooperation such as supported sidelink type (e.g. 3GPP, Wi-Fi or Bluetooth based), supported sidelink latency, supported Uu link (e.g., frequency range FR1, or FR2), and UL transmit power class. As another example, an information set may include location of the UE 115 or link status information of the UE 115 (such as MPE reports and/or power headroom (PHR) reports). In yet another example, an information set may include availability for UE cooperation such as a time duration/window during which the UE 115 is available for cooperation. For example, the time/duration window may indicate time slot comprised of a time stamp and a window length during which the UE 115 is available for UE cooperation. In still another example, an information set may include configuration information associated with the candidate cooperative UE 115 (e.g. DRX cycle information as discussed with reference to FIG. 4). The DRX may be configured as periodic on-off time durations. The contents of the information collected from candidate cooperative UEs may include any combination and/or any subset of the above types of information. For example, the UE cooperation assist module 508 may only collect MPE reports. In another example, the UE cooperation assist module 508 may collect both UE availability information and sidelink capability information.

The UE cooperation assist module 508 may collect the information sets, or a subset of the information sets, at the request of a target UE 115, and/or may collect the information sets as part of regular communication with the candidate cooperative UEs 115. Thus, in some examples the UE cooperation assist module 508 may receive information sets from UEs 115 that proactively send the information to the BS 500, while in other examples the UE cooperation assist module 508 may cause the BS 500 to actively request the UEs 115 for the information, and then store it when received. Such active requests may occur on a schedule for the BS 500, or dynamically either by some internal trigger (such as a communication metric to one or more UEs 115 passing a threshold) or in response to receiving a request from a target UE 115 for information set information.

In some examples, the UE cooperation assist module 508 may cause BS 500 to broadcast the information sets (all or some subset of information from those sets) from candidate cooperative UEs such that any UE within the broadcast may use the information. This may be achieved a variety of ways, including by including the information in system information blocks (SIBs). In some other examples, the UE cooperation assist module 508 may, instead of broadcasting periodically, transmit the information sets to a specific UE 115, or set of UEs 115 using UE dedicated signaling, when that UE 115 requests the BS 500 to do so.

As discussed further below with respect to other figures, the recipient target UE(s) 115 may use the information broadcast or transmitted from the BS 500 to aid in discovering candidate cooperative UEs 115. For example, the target UE 115 may, with this information, be able to discover candidate cooperative UEs 115 that it otherwise would not have been able to because of different sidelink configurations between UEs, separately reported MPE information to the BS 500, and/or different power saving cycles. Once discovery has completed, the UE cooperation assist module 508 may receive from a target UE 115 a cooperative UE update request, requesting that a particular UE 115 (or UEs 115) be added in cooperation to a cooperative UE set. Such particular UE 115 would be the one or more UEs discovered based on the information set information previously provided. The UE cooperation assist module 508 may transmit to the target UE 115 a cooperative UE update comprising a cooperative UE 115 set based on the request.

As an example, this may include control signaling indicating a UE cooperation configuration. The UE cooperation configuration may indicate, to the target UE 115, a configuration for communicating messages, as a single entity, between the BS 500 and a set of antenna panels corresponding to the group of cooperative UEs 115. Each of the cooperating UEs 115 may operate in an active communication state. That is, prior to transmitting the UE cooperation configuration, the BS 500 may transmit control signaling to each cooperative UE 115 indicating an active communication configuration between the cooperative UE 115 and the BS 500. The active communication configuration may enable communication between the UE 115 and the BS 500 on an uplink, a downlink, or both. The BS 500 may subsequently transmit the UE cooperation configuration to the target UE 115 to indicate an identifier (ID) and at least a portion of the active communication configuration for each UE 115 of the group of cooperative UEs 115. The UE cooperation configuration may provide for the target UE 115 to initiate UE cooperation between the group of cooperative UEs 115 to effectively and efficiently communicate with the BS 500 as a single entity using multiple antenna panels associated with the group of cooperative UEs 115.

In some examples, the BS 500 may transmit activation or deactivation signaling (e.g., via a medium access control control element (MAC-CE)) to the target UE 115 to activate or deactivate the UE cooperation. The group of UEs 115 may communicate with the BS 500 as the single entity according to the UE cooperation configuration in response to the activation signaling. In response to the deactivation signaling, the group of UEs 115 may refrain from performing UE cooperation. If the group of UEs 115 are configured to support UE cooperation, the BS 500 may transmit a grant (e.g., downlink control information (DCI)) to the target UE 115 to schedule each downlink message intended for the group of UEs 115. The grant may indicate an ID of the target UE 115 or an ID of one of the other UEs 115 of the group of UEs 115. The target UE 115 may identify, from the set of antenna panels corresponding to the group of UEs 115, an antenna panel for reception of the downlink message based on the grant and the indicated ID.

In some aspects, in addition to collecting information sets from one or more candidate cooperative UEs 115, the UE cooperation assist module 508 may also evaluate the collected information sets in order to determine a preferential cooperative UE set. For example, the UE cooperation assist module 508 may analyze or otherwise use MPE reports and/or UL data from candidate cooperative UEs 115 to determine which UE 115 (or UEs 115) are preferred for cooperation, and then may transmit a cooperative UE update to the target UE 115 based on that determination. This determination of what candidates are preferred may be based on, for example, which UE 115 has experienced fewer or no MPE issues over a certain period. In another example, the determination may be based on an estimate of UL throughput, preferring the UE with the highest estimated UL throughput.

As shown, the transceiver 510 may include the modem subsystem 512 and the RF unit 514. The transceiver 510 can be configured to communicate bi-directionally with other devices, such as the UEs 115 and/or another core network element. The modem subsystem 512 may be configured to modulate and/or encode data according to a MCS, e.g., a LDPC coding scheme, a turbo coding scheme, a convolutional coding scheme, a digital beamforming scheme, etc. The RF unit 514 may be configured to process (e.g., perform analog to digital conversion or digital to analog conversion, etc.) modulated/encoded data (e.g., RRC configuration, CSI-RS resource configuration, CSI-RS report configuration, CSI-RSs, SSB beams, other control data including UE cooperation data and/or data traffic) from the modem subsystem 512 (on outbound transmissions) or of transmissions originating from another source such as a UE 115. The RF unit 514 may be further configured to perform analog beamforming in conjunction with the digital beamforming. Although shown as integrated together in transceiver 510, the modem subsystem 512 and/or the RF unit 514 may be separate devices that are coupled together at the BS 105 to enable the BS 105 to communicate with other devices.

The RF unit 514 may provide the modulated and/or processed data, e.g. data packets (or, more generally, data messages that may contain one or more data packets and other information), to the antennas 516 for transmission to one or more other devices. The antennas 516 may further receive data messages transmitted from other devices and provide the received data messages for processing and/or demodulation at the transceiver 510. The transceiver 510 may provide the demodulated and decoded data (e.g., messages including information sets, requests for information sets, and/or configuration requests) to the UE cooperation assist module 508 for processing. The antennas 516 may include multiple antennas of similar or different designs in order to sustain multiple transmission links. In some aspects, the antennas 516 may in the form of one or more antenna panels or one or more antenna arrays each including a plurality of antenna element that can be selectively configured with different gains and/or phases to generate a beam for transmission and/or reception.

Figure 6:
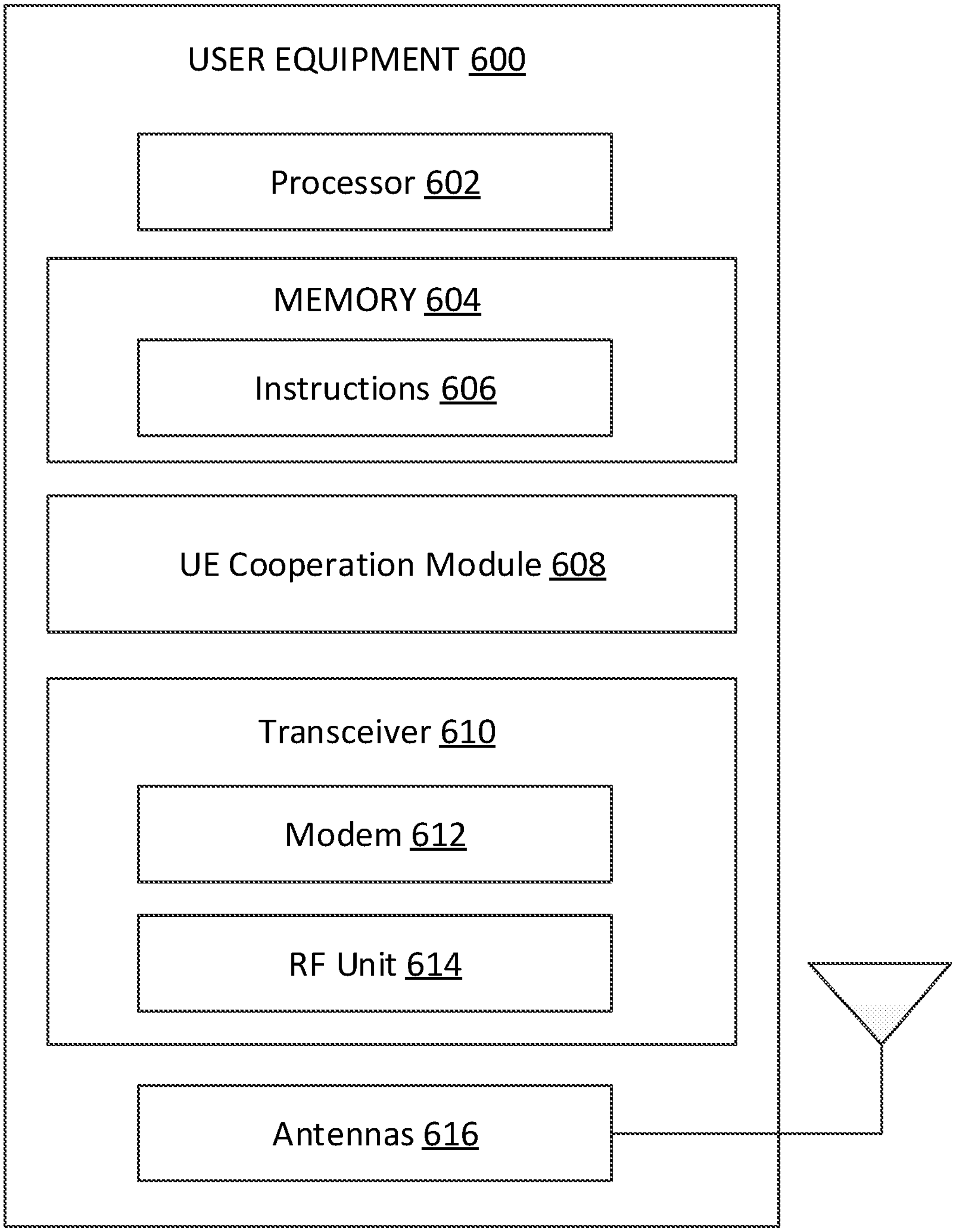
FIG. 6 is a block diagram of an exemplary user equipment according to some aspects of the present disclosure.

FIG. 6 is a block diagram of an exemplary UE 600 according to some aspects of the present disclosure. In some instances, the UE 600 may be a UE 115 as discussed above with respect to FIGS. 1-4. As shown, the UE 600 may include a processor 602, a memory 604, a UE cooperation module 608, a transceiver 610 including a modem subsystem 612 and a radio frequency (RF) unit 614, and one or more antennas 616. These elements may be coupled with one another. The term "coupled" may refer to directly or indirectly coupled or connected to one or more intervening elements. For instance, these elements may be in direct or indirect communication with each other, for example via one or more buses.

The processor 602 may include a central processing unit (CPU), a digital signal processor (DSP), an application specific integrated circuit (ASIC), a controller, a field programmable gate array (FPGA) device, another hardware device, a firmware device, or any combination thereof configured to perform the operations described herein. The processor 602 may also be implemented as a combination of computing devices, e.g., a combination of a DSP and a microprocessor, a plurality of microprocessors, one or more microprocessors in conjunction with a DSP core, or any other such configuration.

The memory 604 may include a cache memory (e.g., a cache memory of the processor 602), random access memory (RAM), magnetoresistive RAM (MRAM), read-only memory (ROM), programmable read-only memory (PROM), erasable programmable read only memory (EPROM), electrically erasable programmable read only memory (EEPROM), flash memory, solid state memory device, hard disk drives, other forms of volatile and non-volatile memory, or a combination of different types of memory. In an aspect, the memory 604 includes a non-transitory computer-readable medium. The memory 604 may store, or have recorded thereon, instructions 606. The instructions 606 may include instructions that, when executed by the processor 602, cause the processor 602 to perform the operations described herein with reference to the UEs 115 in connection with aspects of the present disclosure, for example, aspects of FIGS. 1-4 and 7-14. Instructions 606 may also be referred to as program code, which may be interpreted broadly to include any type of computer-readable statement(s) as discussed above with respect to FIG. 5.

The UE cooperation module 608 may perform functions as described with reference to the other figures herein. The UE cooperation module 608 may, for example, cause the UE 600 to send an information set to a BS (e.g., BS 105 of FIG. 1). As noted with respect to FIG. 5 and elsewhere herein, the BS 105 may, with that information set, assist another UE (e.g., UE 115 of FIG. 1) in discovering and/or cooperating with UE 600 (or vice versa) to communicate with the BS 105 (or multiple BSs 105).

As noted with respect to FIG. 5, the information set may include UE capability available for UE cooperation such as supported sidelink type (e.g. 3GPP, Wi-Fi or Bluetooth based), supported sidelink latency, supported Uu link (e.g., frequency range FR1, or FR2), and UL transmit power class. As another example, the information set may include location of the UE 600 or link status of the UE 600 (such as MPE reports and/or power headroom (PHR) reports). In yet another example, an information set may include availability for UE cooperation such as a time duration/window during which the UE 115 is available for cooperation. For example, the time/duration window may indicate time slot comprised of a time stamp and a window length during which the UE 115 is available for UE cooperation. In still another example, an information set may include configuration information associated with the candidate cooperative UE 115 (e.g. DRX cycle information as discussed with reference to FIG. 4). The DRX may be configured as periodic on-off time durations. The contents of the information collected from candidate cooperative UEs may include any combination and/or any subset of the above types of information. For example, the UE cooperation module 608 may only send MPE reports. In another example, the UE cooperation module 608 may send both UE availability information and sidelink capability information, etc.

The items of the information set may be sent together, or at various times. For example, in some aspects a BS 105 may request (either periodically or dynamically) a specific set of information which the UE cooperation module 608 causes the UE 600 to send together in response. In other aspects, at least some of the information may be sent to the BS 105 separately, either periodically or dynamically. For example, MPE reports may be sent to the BS 105 as they are available.

The UE cooperation module 608 may receive information about candidate cooperate UEs from a BS 105. In some aspects, the information may be received in the form of a broadcast from the BS 105 with all or a subset of the information set described above. In other aspects, the UE cooperation module 608 may receive the information in a transmission from the BS 105 directed to the UE 600 in response to the UE cooperation module 608 causing the UE 600 to request it.

The UE cooperation module 608 may use received information about candidate cooperative UEs 115 in order to discover those UEs 115. For example, the UE cooperation module 608 may aid the UE 600 in configuring sidelink communication parameters based on the received information. For example, the UE 600 may, with this information, be able to discover candidate cooperative UEs 115 that it otherwise would not have been able to because of different sidelink configurations between UEs, separately reported MPE information to the BS 105, and/or different power saving cycles. In some aspects, the UE cooperation module 608 may determine to cooperate with one UE 115 and not another UE 115 based on one or more parameters. As one example, one UE 115 may be selected over another based on their availability as determined by received DRX information relating to those UEs 115. As another example, one UE 115 may be selected over another based on location information (e.g., a closer UE 115 being selected over another, or a more distant UE 115 selected in an effort to avoid some obstruction in the environment, etc.), link status (e.g., MPE report and/or PHR report), time availability, etc.

Once the UE 600 has discovered/determined a candidate cooperative UE 115 (referring to one cooperative UE 115 for sake of illustration, recognizing that any number of cooperative UEs 115 may be configured), the UE cooperation module 608 may send a cooperative UE update request to a BS 105. This request may include which UE 115 or UEs 115 the UE 600 wants to cooperate with. The UE cooperation module 608 may then receive from the BS 105 a cooperative UE update including information about the cooperative UE set. The UE set may include an identification of the UEs requested by the UE cooperation module 608, as well as other control information/signaling such as that described above with respect to FIG. 5.

In another example, instead of the UE 600 discovering candidate cooperative UEs 115 and sending the request to the BS 105, the BS 105 may make some determination itself and update the UE 600 to cooperate with a subset of the requested UEs 115. For example, the UE cooperation module 608 may cause the UE 600 to discover two candidate cooperative UEs 115, and further cause the UE 600 to send a UE update request including both of the discovered UEs 115. The BS 105 may determine a preferential cooperate UE set based on, for example, MPE reports from each of the candidate cooperative UEs (e.g., as collected previously by the BS 105). From this, the BS may determine that one of the discovered UEs 115 is preferred for cooperation over the other. As a result, the UE cooperation module 608 may receive in this example a cooperative UE update including the determined, preferred UE 115 in the cooperative UE set.

Either way, the cooperative UE update may be sent to at least the target UE 600, as well as any cooperative UEs 115. For example, each of the UEs 600 and 115 may receive an active communication configuration that indicates one or more parameters for communications between the virtual UE and the network. The UE 600 may additionally or alternatively receive a UE cooperation configuration that may indicate an ID of the cooperative UE 115 and at least a portion of the active communication configuration for the UE 115. For example, the UE cooperation configuration may indicate an ID of the UE 115, a DCI format configured for the UE 115, a type of the active communication configuration (e.g., an RRC configuration) between the UE 115 and the network, or any combination thereof. The UE 600 may accordingly monitor for and receive DCI having the configured DCI format for the UE 115 or other downlink messages intended for the UE 115 while performing UE cooperation. That is, the UE cooperation configuration may configure the UE 600 to be associated with the ID of the UE 115. The UE cooperation module 608 may connect with the UE 115 via a sidelink interface (e.g., via an unlicensed band, a licensed band, or some combination) with initial parameters configured based on the information received from BS 105. These initial parameters may be adjusted to be more optimal once communication is established between the UEs 115 based on information exchanged between the UEs 115.

Once a cooperative UE set is configured, the UE cooperation module 608 may cause the UE 600 to communicate with a BS 105 via the configured cooperative UE 115 (for uplink and/or downlink, as well as the UE 600 itself communicating with the same or a different BS 105). In instances where UE 600 is being used as a cooperative UE, the UE cooperation module 608 may direct the UE 600 in use to communicate with a BS 105 on behalf of another UE 115 based on the UE cooperation configuration.

As shown, the transceiver 610 may include the modem subsystem 612 and the RF unit 614. The transceiver 610 can be configured to communicate bi-directionally with other devices, such as the BSs 105. The modem subsystem 612 may be configured to modulate and/or encode the data from the memory 604 and/or the UE cooperation module 608 according to a modulation and coding scheme (MCS), e.g., a low-density parity check (LDPC) coding scheme, a turbo coding scheme, a convolutional coding scheme, a digital beamforming scheme, etc. The RF unit 614 may be configured to process (e.g., perform analog to digital conversion or digital to analog conversion, etc.) modulated/encoded data (e.g., UE capability report, beam reports, information sets, UE cooperation data, etc.) from the modem subsystem 612 (on outbound transmissions) or of transmissions originating from another source such as another UE 115 or a BS 105. The RF unit 614 may be further configured to perform analog beamforming in conjunction with the digital beamforming. Although shown as integrated together in transceiver 610, the modem subsystem 612 and the RF unit 614 may be separate devices that are coupled together at the UE 600 to enable the UE 600 to communicate with other devices.

The RF unit 614 may provide the modulated and/or processed data, e.g. data packets (or, more generally, data messages that may include one or more data packets and other information), to the antennas 616 for transmission to one or more other devices. The antennas 616 may further receive data messages transmitted from other devices. The antennas 616 may provide the received data messages for processing and/or demodulation at the transceiver 610. The transceiver 610 may provide the demodulated and decoded data (e.g., candidate cooperative UE information sets) to the UE cooperation module 608 for processing. The antennas 616 may include multiple antennas of similar or different designs in order to sustain multiple transmission links. The RF unit 614 may configure the antennas 616. In some aspects, the antennas 616 may in the form of one or more antenna panels or one or more antenna arrays each including a plurality of antenna element that can be selectively configured with different gains and/or phases to generate a beam for transmission and/or reception.

Figure 7:
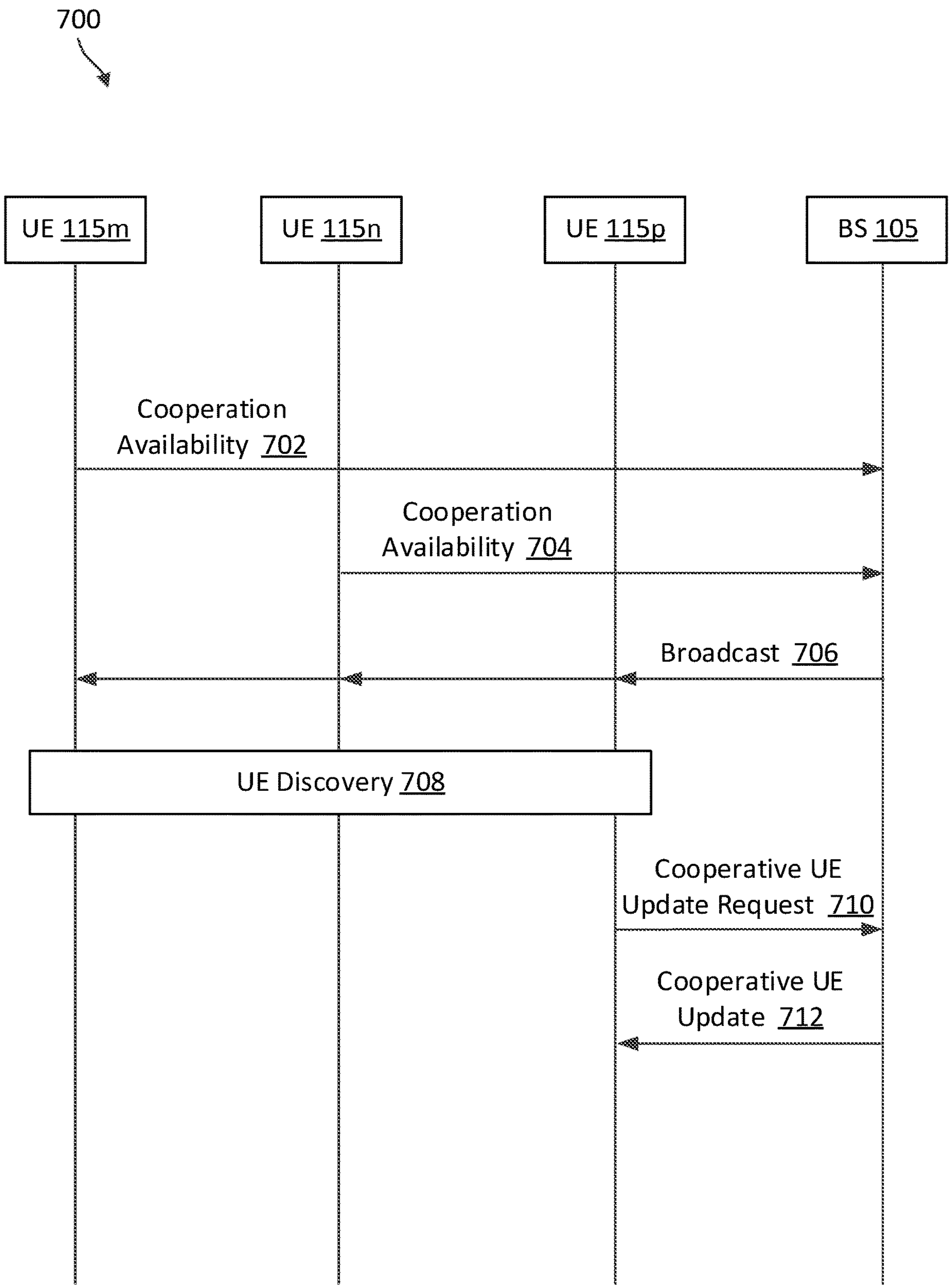
FIGS. 7-9 are exemplary communication protocol diagrams according to some aspects of the present disclosure.

FIG. 7 is an exemplary communication protocol diagram 700, illustrating a method of BS assistance in UE cooperation. Aspects of the protocol diagram 700 may be performed by wireless networks, such as the networks 100, 200, and/or 300. An additional BS 105 or UE 115 may perform the actions described in communication protocol diagram 700 when the network is in a configuration such as those illustrated in FIGS. 2 and 3. Communication described as occurring with BS 105 may occur with a separate BS 105, and information may be shared between the BSs 105 via a backhaul connection (or may be conveyed from the separate BSs 105 to some other common network component). For simplicity of illustration and discussion, communication protocol diagram 700 is illustrated with a single BS 105 and three UEs 115 which may perform functions of the communication protocol diagram 700. In some instances, the BS 105 may utilize TRPs to communicate with the UEs 115.

In some aspects, the BS 105 may utilize one or more components, such as the processor 502, the memory 504, the UE cooperation assist module 508, the transceiver 510, the modem 512, and the one or more antennas 516 shown in FIG. 5, and the UE 115 may utilize one or more components, such as the processor 602, the memory 604, the UE cooperation module 608, the transceiver 610, the modem 612, and the one or more antennas 616 shown in FIG. 6. As illustrated, the protocol diagram 700 includes a number of enumerated actions, but aspects of the FIG. 7 may include additional actions before, after, and in between the enumerated actions. In some aspects, one or more of the enumerated actions may be omitted or performed in a different order.

At action 702, UE 115*m* communicates availability for UE cooperation as an information set to BS 105. The availability information may include, for example, DRX parameters. Availability information is exemplary of one type of information which may be sent by UE 115*m* in order to facilitate UE cooperation. The information set may include UE capability available for UE cooperation such as supported sidelink type (e.g. 3GPP, Wi-Fi or Bluetooth based), supported sidelink latency, supported Uu link (e.g., frequency range FR1, or FR2), and UL transmit power class. As another example, the information set may include location of the UE 600 or link status of the UE 600 (such as MPE reports and/or power headroom (PHR) reports). In another example, an information set may include configuration information associated with the candidate cooperative UEs 115*n* and 115*m* (e.g. DRX cycle information as discussed with reference to FIG. 4). The DRX may be configured as periodic on-off time durations. The contents of the information collected from candidate cooperative UEs may include any combination and/or any subset of the above types of information. For example, the UE cooperation module 608 may only send MPE reports. In another example, the UE cooperation module 608 may send both UE availability information and sidelink capability information, etc.

At action 704, UE 115*n* communicates cooperation availability information to BS 105. The information may be the same type of information as sent by UE 115*m* at action 702. Alternatively, UE 115*n* may send additional information beyond the type sent by UE 115*m*, or may send less information than that sent by UE 115*m*, including overlapping information types between the UEs 115*m* and 115*n*.

At action 706, BS 105 broadcasts the received cooperation availability information to UE 115*m*, UE 115*n*, and UE 115*p*. The BS 105 may broadcast the information via system information, for example, SIB, or via some other signaling such as paging signaling.

At action 708, UE 115*p* discovers UE 115*m* and UE 115*n*. The discovery of UEs 115*m* and 115*n* may be based on the received availability information. In some aspects, UE 115*p* may in particular focus on discovering UEs which are available for cooperation at a desired time (e.g., a desired time for the UE 115*p* that corresponds to availability of the UE 115*m* or 115*n* identified by the received availability information), or that supports a particular sidelink type (e.g. 3GPP, Wi-Fi or Bluetooth based), or latency, or link type, or transmit power class, or location, or link status, or other availability information.

At action 710, UE 115*p* sends a cooperative UE update request to BS 105. The cooperative UE update request may be based on the received availability information and/or which UEs 115 were discovered. In some aspects, the cooperative UE update request indicates one or more discovered UEs in order to request that they be added to a cooperative UE set for enabling UE cooperation.

At action 712, UE 115*p* receives a cooperative UE update from BS 105. The cooperative UE update includes a cooperative UE set which includes all or a subset of the UEs requested by UE 115*p* and the configuration information by which to complete configuration of the cooperate UE set. Once configuration is completed, UE 115*p* may communicate with BS 105 via cooperation with the indicated cooperative UE 115 as a single, virtual UE.

Figure 8:
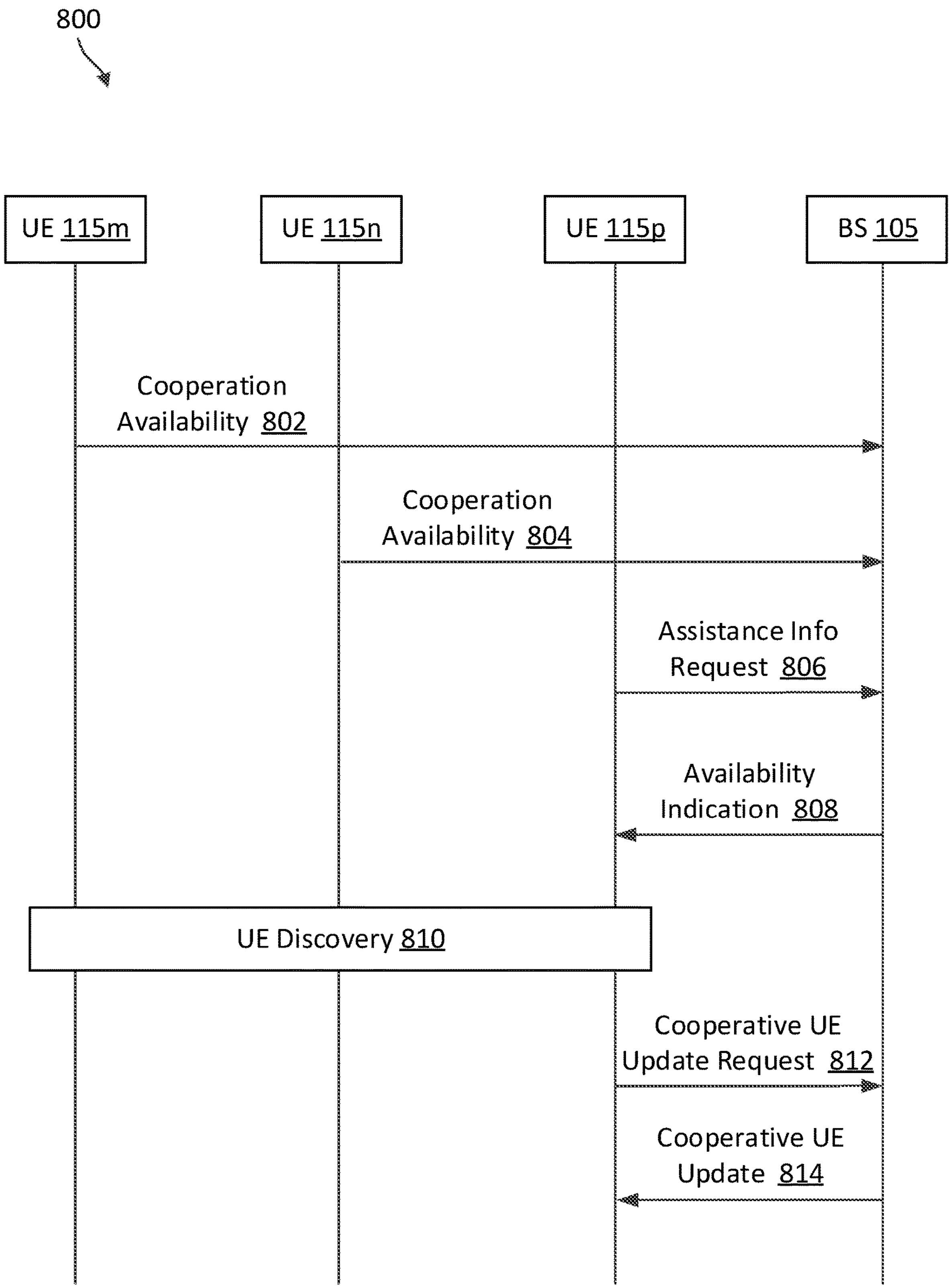

FIG. 8 is an exemplary communication protocol diagram 800, illustrating a method of BS assistance in UE cooperation. Aspects of the protocol diagram 800 may be performed by wireless networks, such as the networks 100, 200, and/or 300. An additional BS 105 or UE 115 may perform the actions described in communication protocol diagram 800 when the network is in a configuration such as those illustrated in FIGS. 2 and 3. Communication described as occurring with BS 105 may occur with a separate BS 105, and information may be shared between the BSs 105 via a backhaul connection (or may be conveyed from the separate BSs 105 to some other common network component). For simplicity of illustration and discussion, communication protocol diagram 800 is illustrated with a single BS 105 and three UEs 115 which may perform functions of the communication protocol diagram 800. In some instances, the BS 105 may utilize TRPs to communicate with the UEs 115.

In some aspects, the BS 105 may utilize one or more components, such as the processor 502, the memory 504, the UE cooperation assist module 508, the transceiver 510, the modem 512, and the one or more antennas 516 shown in FIG. 5, and the UE 115 may utilize one or more components, such as the processor 602, the memory 604, the UE cooperation module 608, the transceiver 610, the modem 612, and the one or more antennas 616 shown in FIG. 6. As illustrated, the protocol diagram 800 includes a number of enumerated actions, but aspects of the FIG. 8 may include additional actions before, after, and in between the enumerated actions. In some aspects, one or more of the enumerated actions may be omitted or performed in a different order.

At action 802, UE 115*m* communicates cooperation availability information as an information set to BS 105, similar to the description related to action 702 of FIG. 7 above.

At action 804, UE 115*n* communicates cooperation availability information to BS 105. The information may be the same type of information as sent by UE 115*m* at action 802, as is further discussed with respect to action 704 of FIG. 7 above.

At action 806, UE 115*p* transmits a request for assistance information about candidate cooperative UEs to the BS 105. In some aspects, the request may be a general request for which the BS 105 is preconfigured to respond with certain information (e.g., responding with one or more information sets of candidate cooperative UEs, with either all the information originally received from the candidate cooperative UEs, such as UEs 115*m* and 115*n* at actions 802 and 804, or some predetermined subset of that information from each UE). In other aspects, the requesting UE 115*p* indicates which information is desired of the BS 105 in order to aid in discovering candidate cooperative UEs 115. For example, the request may be transmitted as a scheduling request such as PUCCH or PRACH, as a L1 CSI report and L2 MAC-CE report, or as UE assistance information.

At action 808, BS 105 transmits the received availability information to UE 115*p* with signaling to UE 115*p*. As UE 115*p* requested the information, BS 105 may communicate the information addressed to the UE 115*p* instead of broadcasting the information more generally. This may be sent, for example, as part of control signaling to the UE 115*p* in response to the request.

At action 810, UE 115*p* discovers UE 115*m* and UE 115*n*. The discovery of UEs 115*m* and 115*n* may be based on the received availability information. In some aspects, UE 115*p* may in particular focus on discovering UEs which are available according to some target parameter, such as a desired time, supports a particular sidelink type (e.g. 3GPP, Wi-Fi or Bluetooth based), latency, link type, transmit power class, location, link status, or other availability information.

At action 812, UE 115*p* sends a cooperative UE update request to BS 105. The cooperative UE update request may be based on the received availability information and/or which UEs 115 were discovered. In some aspects the cooperative UE update request indicates one or more discovered UEs in order to request that they be added to a cooperative UE set.

At action 814, UE 115*p* receives a cooperative UE update from BS 105. The cooperative UE update includes a cooperative UE set which includes all or a subset of the UEs requested by UE 115*p* and the configuration information by which to complete configuration of the cooperative UE set, such as discussed above with respect to action 712 of FIG. 7 also. Once configuration is completed, UE 115*p* may communicate with BS 105 via cooperation with the indicated cooperative UE 115 as a virtual UE.

Figure 9:
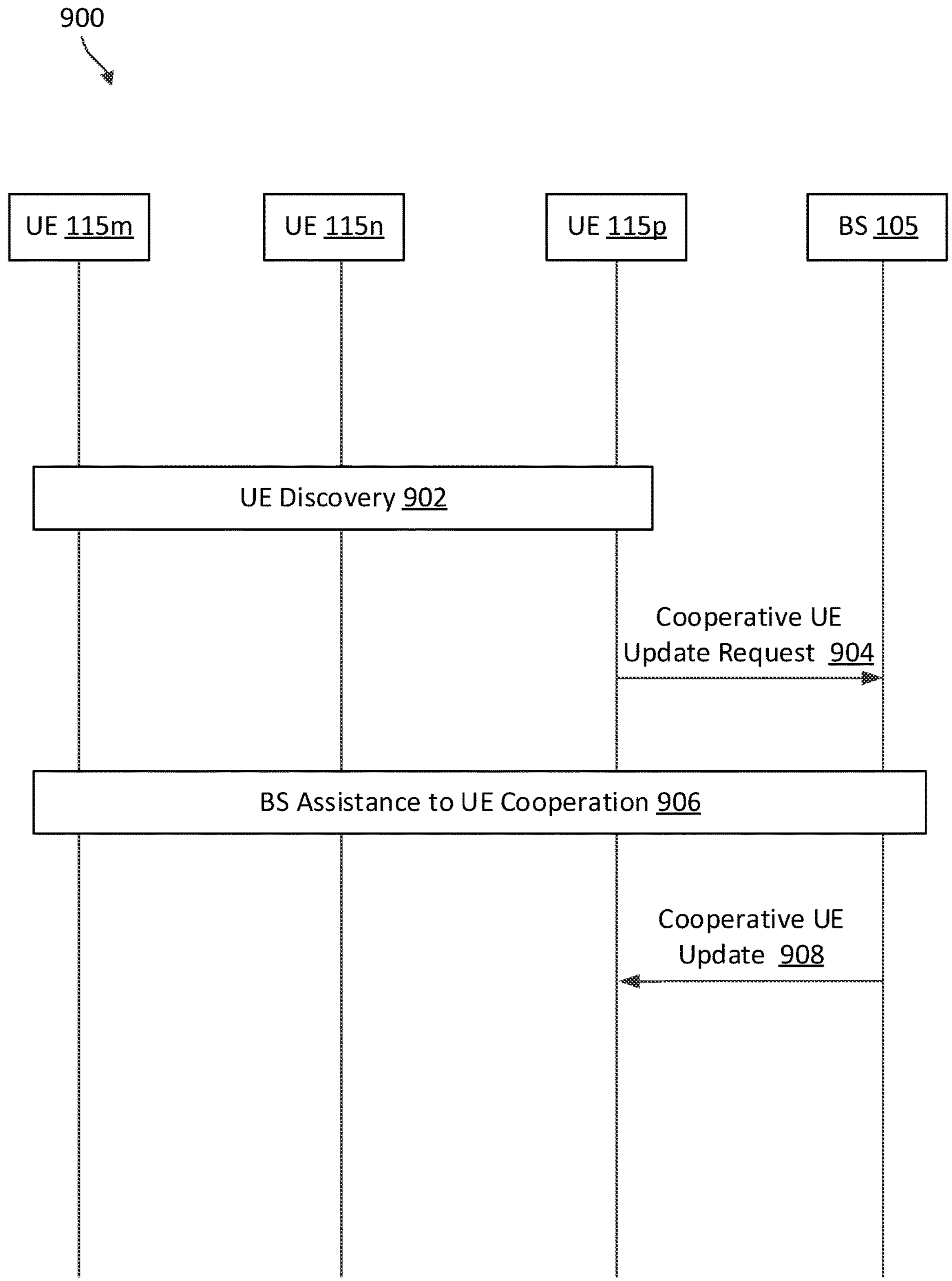

FIG. 9 is an exemplary communication protocol diagram 900, illustrating a method of BS assistance in UE cooperation. Aspects of the protocol diagram 900 may be performed by wireless networks, such as the networks 100, 200, and/or 300. An additional BS 105 or UE 115 may perform the actions described in communication protocol diagram 900 when the network is in a configuration such as those illustrated in FIGS. 2 and 3. Communication described as occurring with BS 105 may occur with a separate BS 105, and information may be shared between the BSs 105 via a backhaul connection (or may be conveyed from the separate BSs 105 to some other common network component). For simplicity of illustration and discussion, communication protocol diagram 900 is illustrated with a single BS 105 and three UEs 115 which may perform functions of the communication protocol diagram 900. In some instances, the BS 105 may utilize TRPs to communicate with the UEs 115.

In some aspects, the BS 105 may utilize one or more components, such as the processor 502, the memory 504, the UE cooperation assist module 508, the transceiver 510, the modem 512, and the one or more antennas 516 shown in FIG. 5, and the UE 115 may utilize one or more components, such as the processor 602, the memory 604, the UE cooperation module 608, the transceiver 610, the modem 612, and the one or more antennas 616 shown in FIG. 6. As illustrated, the protocol diagram 900 includes a number of enumerated actions, but aspects of the FIG. 9 may include additional actions before, after, and in between the enumerated actions. In some aspects, one or more of the enumerated actions may be omitted or performed in a different order.

At action 902, UE 115*p* discovers UE 115*m* and UE 115*n*. In this example, the discovery is completed without the assistance of BS 105. In other examples, the BS 105 may have sent information sets to the UE 115*p* prior to action 902, on which basis the UE 115*p* is then able to discover UE 115*m* and/or UE 115*n*. In some embodiments, it may be beneficial to have BS 105 assist in determining which of the discovered UEs 115 is preferable for cooperative communication (e.g., instead of UE 115*p* making its own determination of a desired cooperative UE set). UE 115*p* may determine to attempt cooperative UE communication based on one or more MPE events, or some other UL problem which may potentially be alleviated by communicating via a cooperative UE 115.

At action 904, UE 115*p* sends a cooperative UE update request to BS 105. The cooperative UE update request indicates one or more discovered UEs in order to request that they be added to a cooperative UE set (e.g., such as one or both of UEs 115*m* and 115*n* discovered at action 902). The cooperative UE update request may contain an explicit indication that assistance is requested in determining which UE is preferential for cooperative communication. In other examples, the assistance request may be implied by the information included in the cooperate UE update request.

At action 906, BS 105 provides assistance to UE cooperation. This assistance may include collecting MPE reports and/or UL information from candidate cooperative UEs 115*m* and 115*n*. The BS 105 may, for example, analyze MPE reports and/or UL information in order to determine which UE is preferential for cooperative communication. For example, if UE 115*m* has had a larger number of MPE events over a certain time interval than UE 115*n*, BS 105 may determine the UE 115*n* is more suitable for cooperative communication.

At action 908, BS 105 sends a cooperative UE update to UE 115*p*. The cooperative UE update may include a cooperative UE set with the preferred UE 115 as determined at action 906, as well as other configuration information by which to complete configuration of the cooperative UE set.

Figure 10:
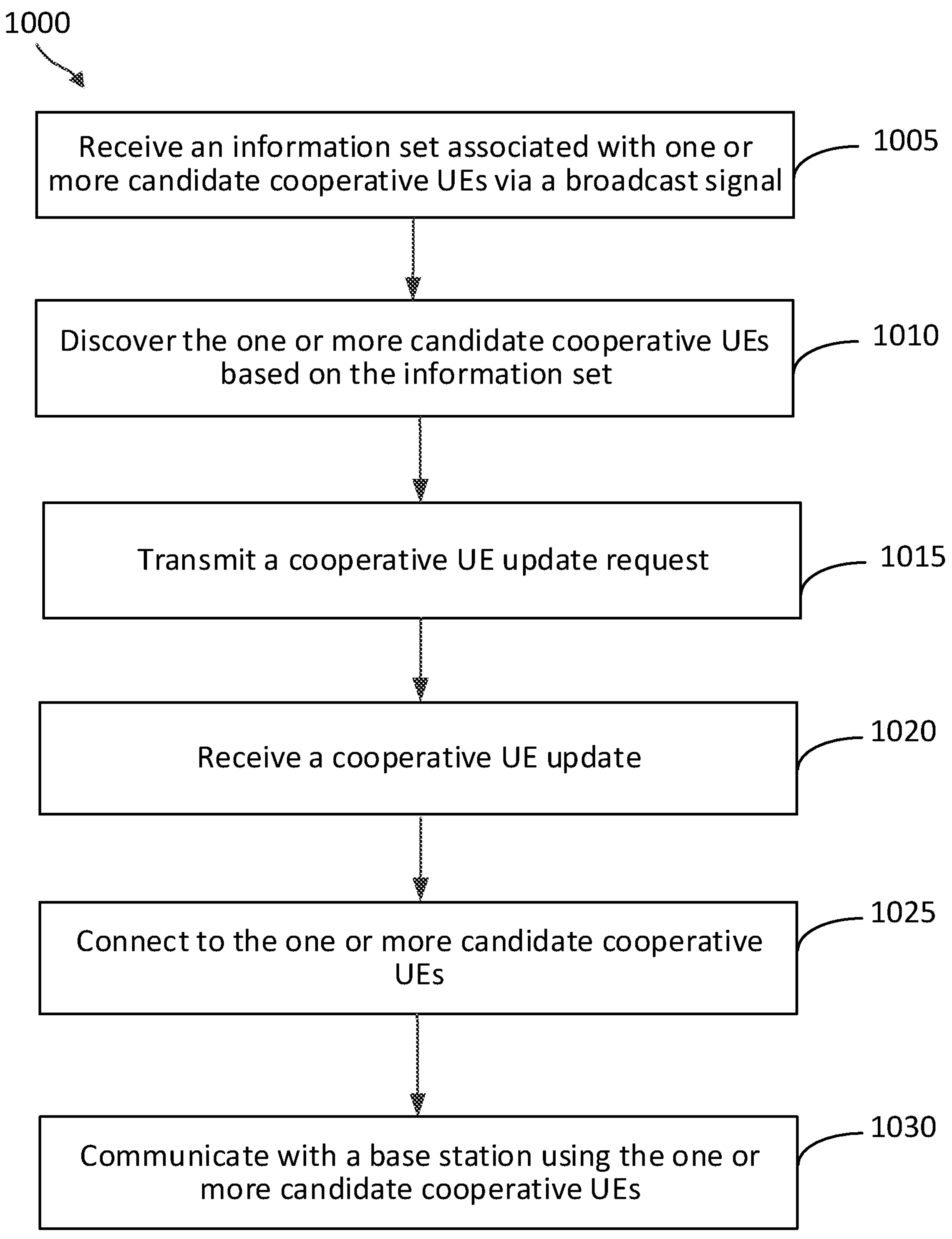
FIGS. 10-14 are exemplary flow diagrams according to some aspects of the present disclosure.

FIG. 10 is an exemplary flow diagram, illustrating a method 1000 of BS assistance in UE cooperation. Aspects of the method 1000 can be executed by a computing device (e.g., a processor, processing circuit, and/or other suitable component) of a wireless communication device or other suitable means for performing the steps. For example, a UE (e.g., UE 115 of FIG. 1) may utilize one or more components, such as the processor 602, the memory 604, the UE cooperation module 608, the transceiver 610, the modem 612, and the one or more antennas 616 shown in FIG. 6. As illustrated, the method 1000 includes a number of enumerated steps, but aspects of the method 1000 may include additional steps before, after, and in between the enumerated steps. In some aspects, one or more of the enumerated steps may be omitted or performed in a different order.

At block 1005, a UE 115 receives an information set associated with one or more candidate cooperative UEs via a broadcast signal. The information set may include any of a number of pieces of information associated with the candidate cooperative UEs 115. In some aspects, the information set includes UE capability available for UE cooperation such as supported sidelink type (e.g. 3GPP, Wi-Fi or Bluetooth based), supported sidelink latency, supported Uu link (e.g., frequency range FR1, or FR2), and UL transmit power class. In some aspects, the information set includes location or link status of the UEs 115 such as MPE reports and power headroom (PHR) reports. In yet another example, an information set may include availability for UE cooperation such as a time duration/window during which the UE 115 is available for cooperation. For example, the time/ duration window may indicate time slot comprised of a time stamp and a window length during which the UE 115 is available for UE cooperation. In still another example, an information set may include configuration information associated with the candidate cooperative UE 115 (e.g. DRX cycle information as discussed with reference to FIG. 4). The DRX may be configured as periodic on-off time durations. The contents of the information collected from candidate cooperative UEs may include any combination and/or any subset of the above types of information. The contents of the information collected from candidate cooperative UEs may include any combination and/or any subset of the above types of information. For example, the information set may only collect MPE reports. In another example, the information set may include both UE availability information and sidelink capability information.

At block 1010, the UE 115 discovers the one or more candidate cooperative UEs 115 based on the information set received at block 1005. For example, the UE 115 may use the information to know how it may discover the candidate cooperative UEs 115.

At block 1015, the UE 115 transmits a cooperative UE update request to the BS (e.g., BS 105 of FIG. 1). The cooperative UE update request may include an indication of the discovered candidate cooperative UEs 115.

At block 1020, the UE 115 receives a cooperative UE update from the BS 105 indicating which UEs 115 are included in the cooperative UE set. The cooperative UE update may also include active communication configuration information that indicates one or more parameters for communications between the virtual UE (the UE 115 and one or more discovered UEs) and the network. This may include an ID of the cooperative, discovered UEs and at least a portion of the active communication configuration for the discovered UEs. For example, this may include one or more of IDs of the discovered UEs, DCI formats configured for the discovered UEs, a type of the active communication configuration (e.g., an RRC configuration) between the discovered UEs and the network, or any combination thereof.

At block 1025, the UE 115 connects to the one or more candidate cooperative UEs via a sidelink channel. This connection may be established based on the cooperative UE update received from a BS 105 at block 1020.

At block 1030, the UE 115 communicates with a BS 105 using the one or more candidate cooperative UEs. The BS 105 may be the same BS 105 with which the UE 115 is already communicating or may be a separate BS 105 as is illustrated and discussed with respect to FIG. 2.

Figure 11:
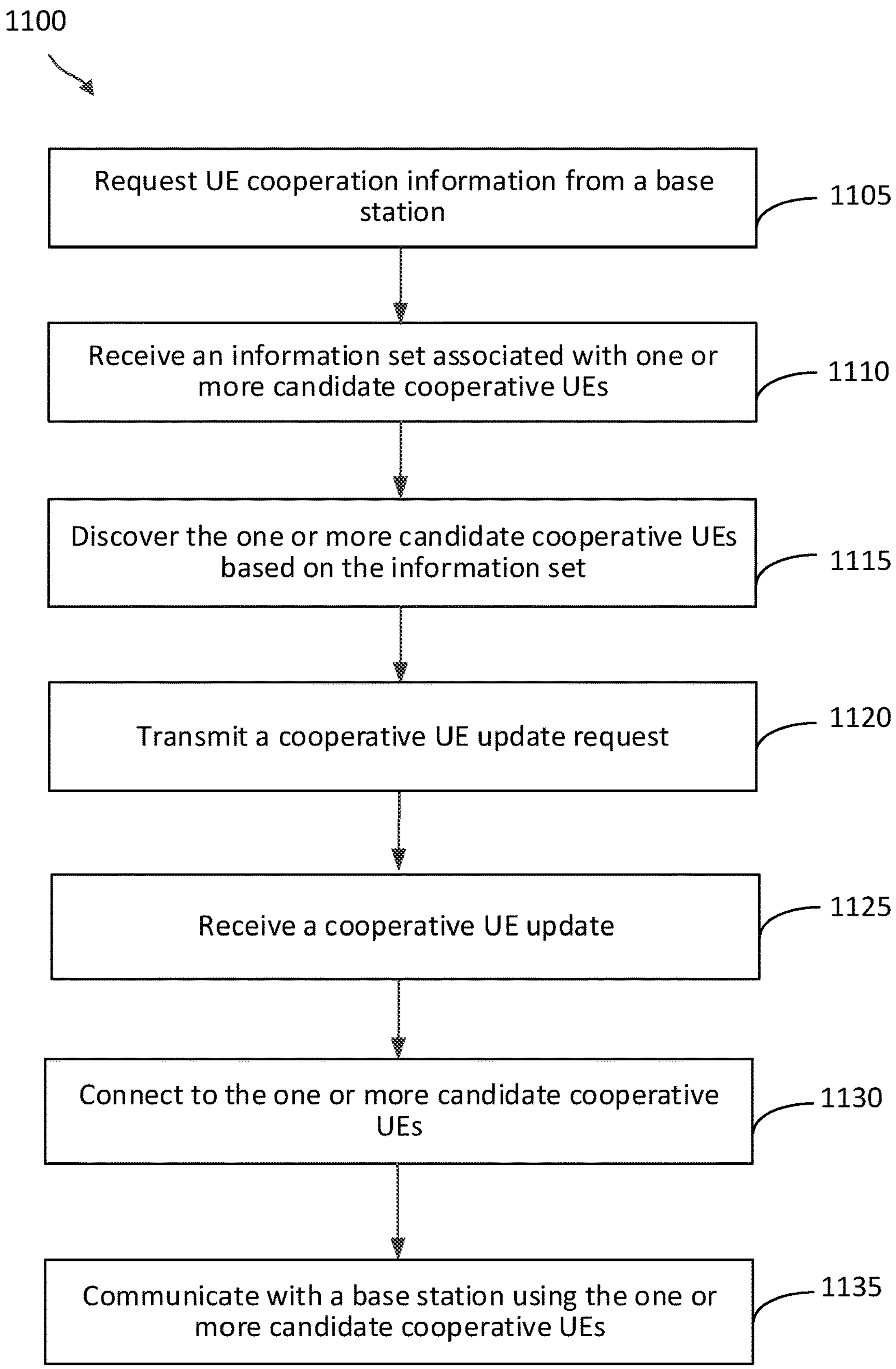

FIG. 11 is an exemplary flow diagram, illustrating a method 1100 of BS assistance in UE cooperation. Aspects of the method 1100 can be executed by a computing device (e.g., a processor, processing circuit, and/or other suitable component) of a wireless communication device or other suitable means for performing the steps. For example, a UE (e.g., UE 115 of FIG. 1) may utilize one or more components, such as the processor 602, the memory 604, the UE cooperation module 608, the transceiver 610, the modem 612, and the one or more antennas 616 shown in FIG. 6. As illustrated, the method 1100 includes a number of enumerated steps, but aspects of the method 1100 may include additional steps before, after, and in between the enumerated steps. In some aspects, one or more of the enumerated steps may be omitted or performed in a different order.

At block 1105, a UE 115 transmits a request for UE cooperation information to a BS (e.g., BS 105 of FIG. 1). The information may be all or a subset of the types of information discussed above with reference to block 1005 of FIG. 10, for example.

At block 1110, the UE 115 receives an information set associated with one or more candidate cooperative UEs 115 in response to the request transmitted at block 1105. As this information is sent in response to a request from the UE 115, it may be received via direct communication rather than a broadcast.

At block 1115, the UE 115 discovers the one or more candidate cooperative UEs based on the information set, as discussed above with respect to block 1010 of FIG. 10, as well as action 810 of FIG. 8 described above.

At block 1120, the UE 115 transmits a cooperative UE update request to the BS 105. The cooperative UE update request may include an indication of the discovered candidate cooperative UEs 115.

At block 1125, the UE 115 receives a cooperative UE update from the BS 105 indicating which UEs 115 are included in the cooperative UE set. The cooperative UE update may also include active communication configuration information that indicates one or more parameters for communications between the virtual UE (the UE 115 and one or more discovered UEs) and the network. This may include an ID of the cooperative, discovered UEs and at least a portion of the active communication configuration for the discovered UEs. For example, this may include one or more of IDs of the discovered UEs, DCI formats configured for the discovered UEs, a type of the active communication configuration (e.g., an RRC configuration) between the discovered UEs and the network, or any combination thereof.

At block 1130, the UE 115 connects to the one or more candidate cooperative UEs via a sidelink channel. This connection may be established based on a cooperative UE update received from the BS 105 at block 1125.

At block 1135, the UE 115 communicates with a BS 105 using the one or more candidate cooperative UEs. The BS 105 may be the same BS 105 with which the UE 115 is already communicating or may be a separate BS 105 as is illustrated and discussed with respect to FIG. 2.

Figure 12:
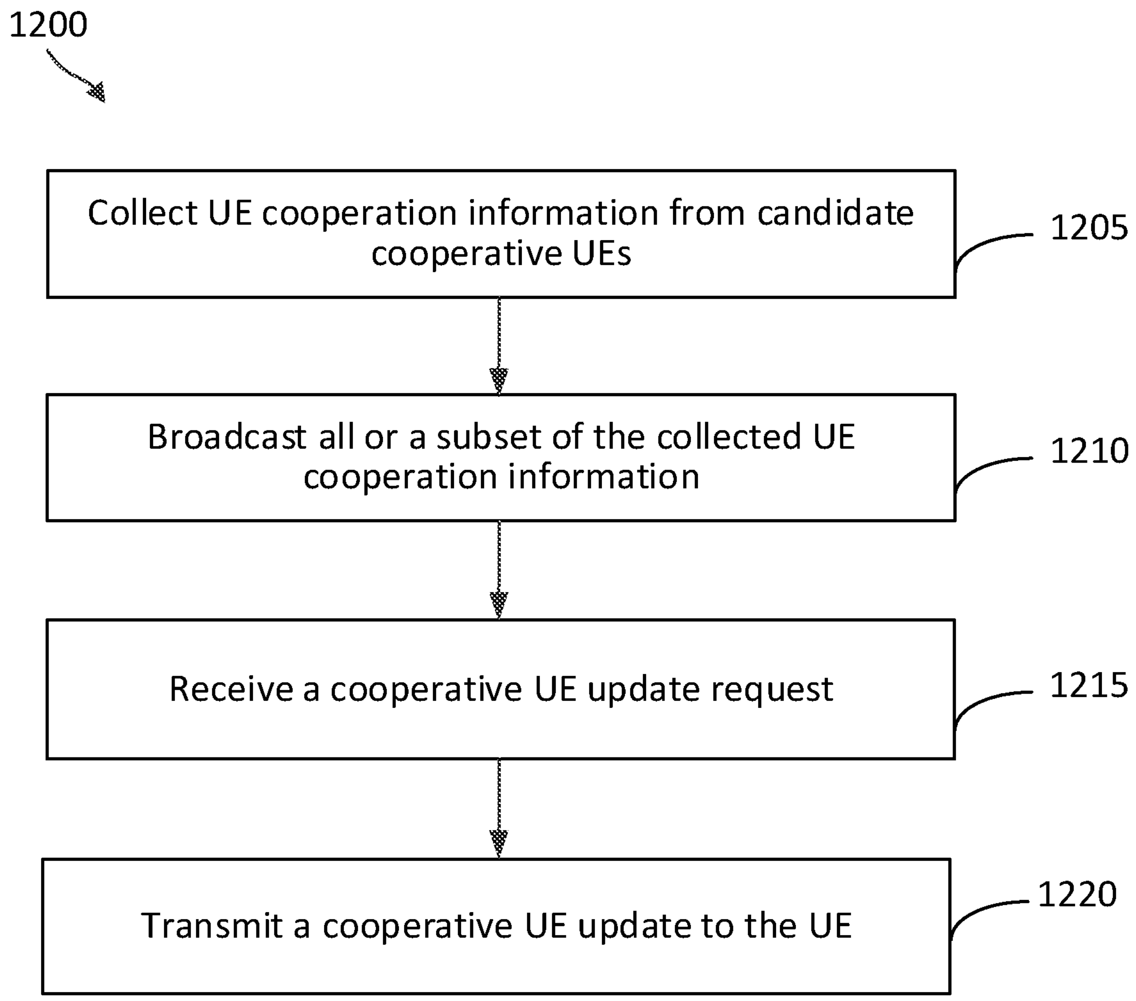

FIG. 12 is an exemplary flow diagram 1200, illustrating a method of BS assistance in UE cooperation. Aspects of the method 1200 can be executed by a computing device (e.g., a processor, processing circuit, and/or other suitable component) of a wireless communication device or other suitable means for performing the steps. For example, a BS (e.g., BS 105 of FIG. 1) may utilize one or more components, such as the processor 502, the memory 504, the UE cooperation assist module 508, the transceiver 510, the modem 512, and the one or more antennas 516 shown in FIG. 5. As illustrated, the method 1200 includes a number of enumerated steps, but aspects of the method 1200 may include additional steps before, after, and in between the enumerated steps. In some aspects, one or more of the enumerated steps may be omitted or performed in a different order.

At block 1205, a BS 105 collects UE cooperation information from candidate cooperative UEs 115. The information collected may be an information set with the types of information described with reference to FIG. 10. The information may be received by the BS 105 in response to a request associated with a UE cooperation request. In some aspects, the information, or part of the information, is received by the BS during the normal communication with the candidate cooperative UE 115. For example, the BS 105 may continuously receive MPE reports from the candidate cooperative UEs even when there is no UE requesting cooperative UE information. As another example, the information, or part of the information, may be received first upon request by the BS 105.

At block 1210, the BS 105 broadcasts all or a subset of the collected UE cooperation information. The broadcast may be performed by a variety of signaling, such as via system information as an example.

At block 1215, the BS 105 receives a cooperative UE update request from a UE 115. In some aspects, the cooperative UE update request indicates one or more discovered UEs in order to request that they be added to a cooperative UE set. In response to the request, the BS 105 may determine an active communication configuration that indicates one or more parameters for communications between the virtual UE (the UE 115 and one or more discovered UEs) and the network. This may include determination of an ID of the cooperative, discovered UEs and at least a portion of the active communication configuration for the discovered UEs. For example, this may include determining one or more of IDs of the discovered UEs, DCI formats configured for the discovered UEs, a type of the active communication configuration (e.g., an RRC configuration) between the discovered UEs and the network, or any combination thereof.

At block 1220, the BS 105 transmits a cooperative UE update to the UE 115 as determined as a result of the request received at block 1215. The cooperative UE update may include a cooperative UE set which contains all or a subset of the requested cooperative UEs, with the active communication configuration as determined so that the UEs 115 may proceed with establishing cooperative communication as a virtual UE with the BS 105.

Figure 13:
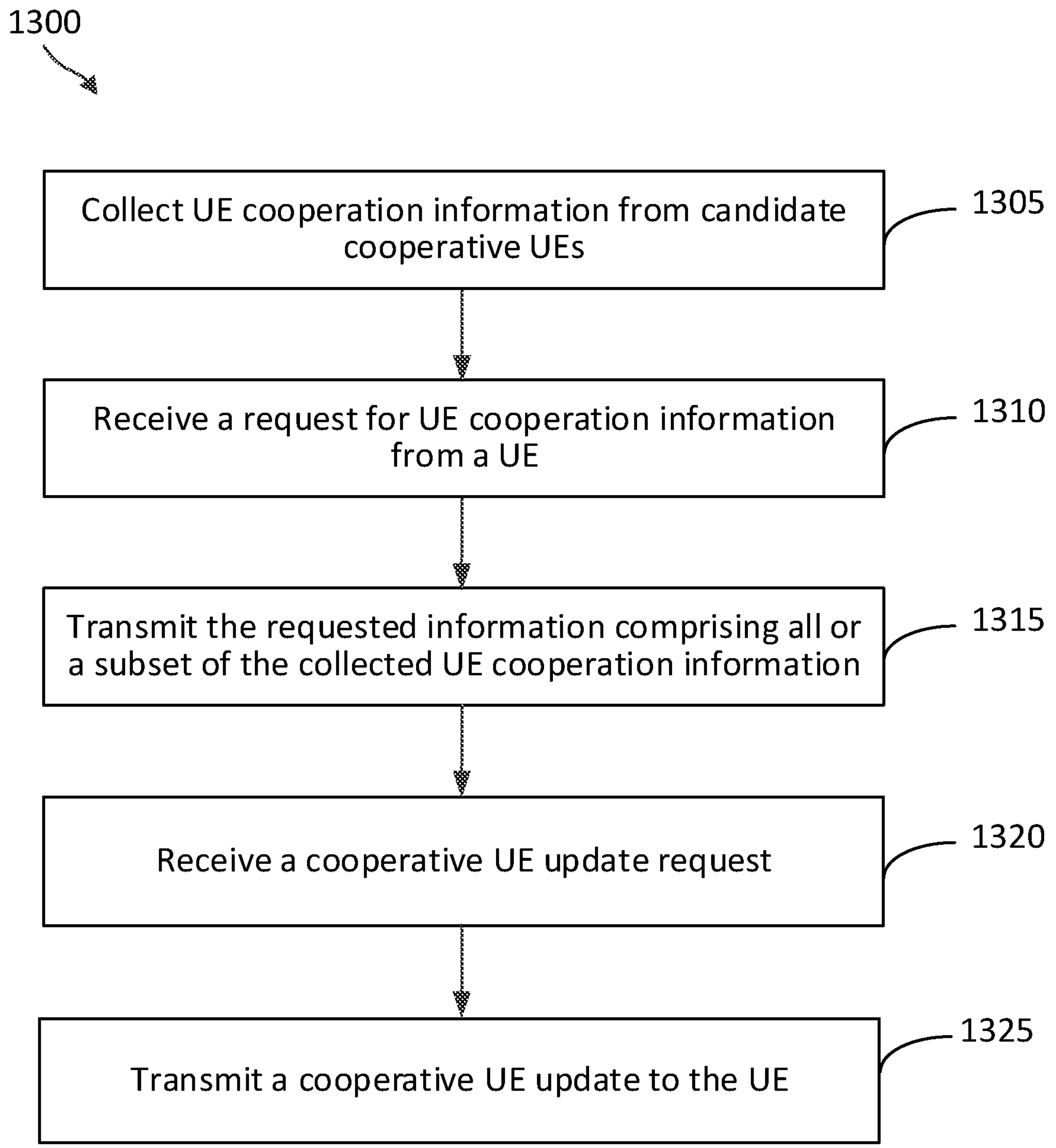

FIG. 13 is an exemplary flow diagram 1300, illustrating a method of BS assistance in UE cooperation. Aspects of the method 1300 can be executed by a computing device (e.g., a processor, processing circuit, and/or other suitable component) of a wireless communication device or other suitable means for performing the steps. For example, a BS 105 may utilize one or more components, such as the processor 502, the memory 504, the UE cooperation assist module 508, the transceiver 510, the modem 512, and the one or more antennas 516 shown in FIG. 5. As illustrated, the method 1300 includes a number of enumerated steps, but aspects of the method 1300 may include additional steps before, after, and in between the enumerated steps. In some aspects, one or more of the enumerated steps may be omitted or performed in a different order.

At block 1305, a BS 105 collects UE cooperation information from candidate cooperative UEs. The information collected may be an information set with the types of information described with reference to FIG. 10. The information may be received by the BS 105 in response to a request associated with a UE cooperation request. In some aspects, the information, or part of the information, is received by the BS during the normal communication with the candidate cooperative UE 115. For example, the BS 105 may continuously receive MPE reports from the candidate cooperative UEs even when there is no UE requesting cooperative UE information. As another example, the information, or part of the information, may be received first upon request by the BS 105.

At block 1310, the BS 105 receives a request for cooperative UE information from a UE 115 (e.g., similar to the request for assistance information about candidate cooperative UEs described at action 806 of FIG. 8). In some aspects, the request may be a general request for which the BS 105 is preconfigured to respond with certain information. In other aspects, the UE 115 indicates which information is desired in order to aid in discovering candidate cooperative UEs 115.

At block 1315, the BS 105 transmits the requested information comprising all or a subset of the collected UE cooperation information to the requesting UE 115, responsive to the request received at block 1310.

At block 1320, the BS 105 receives a cooperative UE update request from a UE 115. The cooperative UE update request may indicate one or more UEs 115 which are desired for cooperative communication, which the UE has discovered based on the transmitted information (as described at block 1315 above). In response to the request, the BS 105 may determine an active communication configuration that indicates one or more parameters for communications between the virtual UE (the UE 115 and one or more discovered UEs) and the network. This may include determination of an ID of the cooperative, discovered UEs and at least a portion of the active communication configuration for the discovered UEs. For example, this may include determining one or more of IDs of the discovered UEs, DCI formats configured for the discovered UEs, a type of the active communication configuration (e.g., an RRC configuration) between the discovered UEs and the network, or any combination thereof.

At block 1325, the BS transmits a cooperative UE update to the UE 115 with a cooperative UE set containing all or a subset of the requested UEs 115 as determined as a result of the request received at block 1320. The cooperative UE update may include the active communication configuration as determined so that the UEs 115 may proceed with establishing cooperative communication as a virtual UE with the BS 105.

Figure 14:
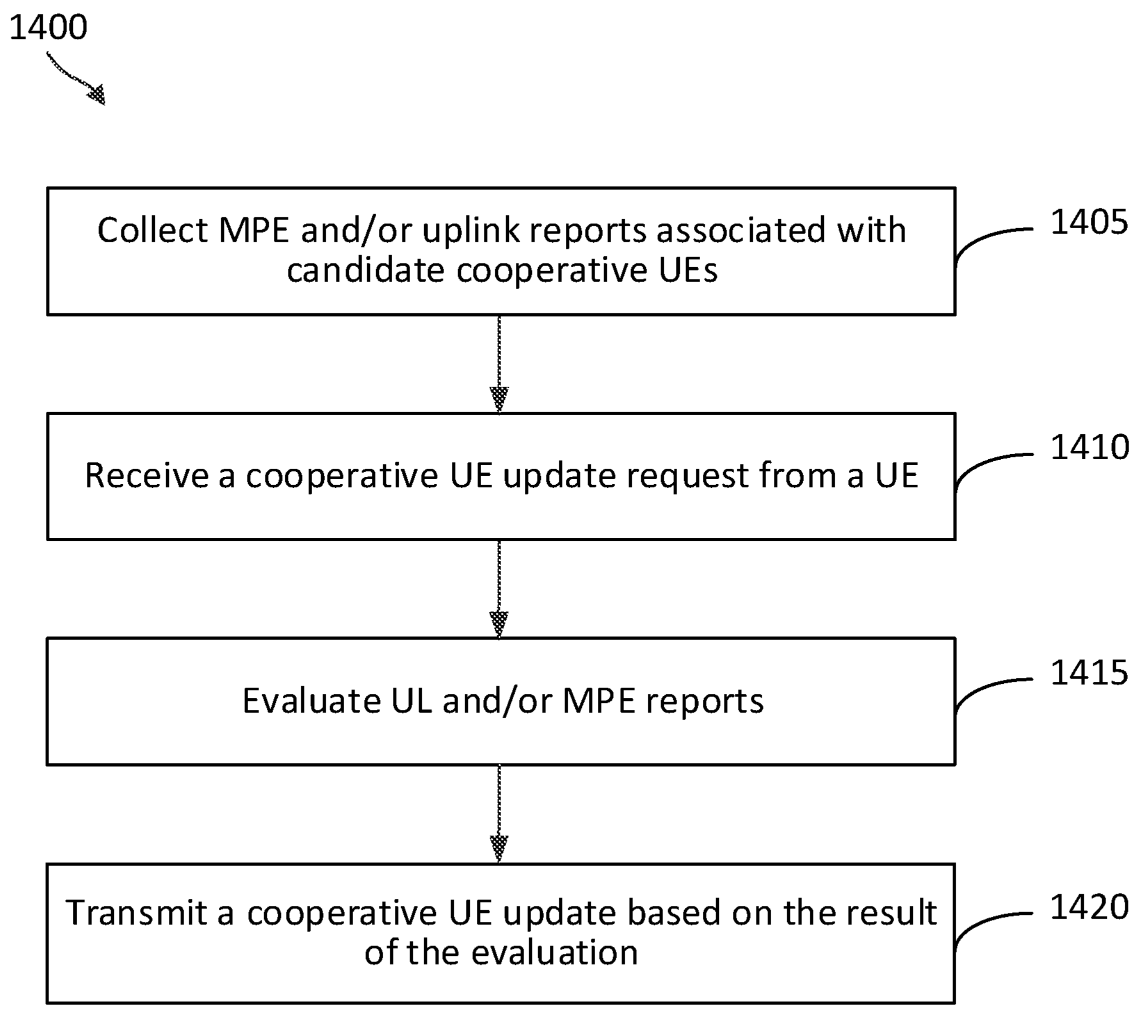

FIG. 14 is an exemplary flow diagram 1400, illustrating a method of BS assistance in UE cooperation. Aspects of the method 1400 can be executed by a computing device (e.g., a processor, processing circuit, and/or other suitable component) of a wireless communication device or other suitable means for performing the steps. For example, a BS 105 may utilize one or more components, such as the processor 502, the memory 504, the UE cooperation assist module 508, the transceiver 510, the modem 512, and the one or more antennas 516 shown in FIG. 5. As illustrated, the method 1400 includes a number of enumerated steps, but aspects of the method 1400 may include additional steps before, after, and in between the enumerated steps. In some aspects, one or more of the enumerated steps may be omitted or performed in a different order.

At block 1405, a BS 105 collects MPE and/or uplink reports associated with candidate cooperative UEs. In some aspects, the BS 105 collects the MPE and/or uplink reports directly from the candidate cooperative UEs. In other aspects, the UE 115 collects the MPE and/or uplink reports from the candidate cooperative UEs and sends the information to the BS 105.

At block 1410, the BS 105 receives a cooperative UE update request from a UE 115. The cooperative UE update request may include candidate cooperative UEs 115 which the UE 115 discovered itself or with the assistance of the BS 105.

At block 1415, the BS 105 evaluates the UL and/or MPE reports. Based on the analysis, the BS 105 will determine which UE(s) 115 are best suited for cooperative communication. For example, a UE with a lower number of MPE events may be preferential to a UE with a high number of MPE events. As another example, the UE with the highest estimated UL throughput may be preferred.

At block 1420, the BS 105 transmits a cooperative UE update based on the result of the evaluation. This may include an active communication configuration so that the UEs 115 may proceed with establishing cooperative communication as a virtual UE with the BS 105.

The present disclosure also includes the following aspects:

Aspect 1. A method of wireless communication comprising:

receiving, by a user equipment (UE) from a base station (BS), a first information set associated with a candidate cooperative UE;

discovering, by the UE, the candidate cooperative UE based on the first information set;

connecting, by the UE to the candidate cooperative UE; and communicating, by the UE with the BS, through the candidate cooperative UE.

Aspect 2. The method of aspect 1, wherein the first information set comprises at least one of:

UE capability information of the candidate cooperative UE, UE availability information of the candidate cooperative UE, UE link status information of the candidate cooperative UE, or UE configuration information of the candidate cooperative UE.

Aspect 3. The method of aspect 2, wherein the UE availability information comprises discontinuous reception (DRX) information of the candidate cooperative UE.

Aspect 4. The method of any of aspects 1-3, wherein the receiving is from a broadcast signal by the BS.

Aspect 5. The method of any of aspects 1-3, further comprising:

communicating, by the UE to the BS, a request for the first information set, wherein the receiving of the first information set is in response to the request.

Aspect 6. The method of any of aspects 1-5, wherein:

the BS comprises a first BS and a second BS, and the receiving is from the first BS and the communicating is with the second BS.

Aspect 7. The method of any of aspects 1-6, further comprising:

communicating, by the UE to the BS, a second information set associated with the UE.

Aspect 8. The method of aspect 7, wherein the second information set comprises a same type of information as the first information set.

Aspect 9. A method of wireless communication comprising:

receiving, by a base station (BS) from a candidate cooperative user equipment (UE), a first information set associated with the candidate cooperative UE;

communicating, by the BS to a target UE, at least a portion of the first information set; and receiving, by the BS from the target UE, a cooperative UE update request based on the at least a portion of the first information set.

Aspect 10. The method of aspect 9, wherein the first information set comprises at least one of:

UE capability information of the candidate cooperative UE, UE availability information of the candidate cooperative UE, UE link status information of the candidate cooperative UE, or UE configuration information of the candidate cooperative UE.

Aspect 11. The method of aspect 10, wherein the UE availability information comprises discontinuous reception (DRX) information of the candidate cooperative UE.

Aspect 12. The method of any of aspects 9-11, wherein the communicating comprising broadcasting by the BS.

Aspect 13. The method of any of aspects 9-11, further comprising:

receiving, from the target UE, a request for at least a portion of the first information set, wherein the communicating is in response to the request.

Aspect 14. The method of any of aspects 9-13, further comprising:

receiving, by the BS from the target UE, a second information set associated with the target UE.

Aspect 15. The method of aspect 14, wherein the second information set comprises the same type of information as the first information set.

Aspect 16. A user equipment (UE) comprising:

a transceiver configured to:

receive, from a base station (BS), a first information set associated with a candidate cooperative UE; and a processor configured to:

discover the candidate cooperative UE based on the first information set; and connect to the candidate cooperative UE, wherein the transceiver is further configured to communicate with the BS through the candidate cooperative UE.

Aspect 17. The UE of aspect 16, wherein the first information set comprises at least one of:

UE capability information of the candidate cooperative UE, UE availability information of the candidate cooperative UE, UE link status information of the candidate cooperative UE, or UE configuration information of the candidate cooperative UE.

Aspect 18. The UE of aspect 17, wherein the UE availability information comprises discontinuous reception (DRX) information of the candidate cooperative UE.

Aspect 19. The UE of any of aspects 16-18, wherein the receipt of the first information set is from a broadcast signal by the BS.

Aspect 20. The UE of any of aspects 16-18, wherein:

the transceiver is further configured to communicate, to the BS, a request for the first information set, and the receipt of the first information set is in response to the request.

Aspect 21. The UE of any of aspects 16-20, wherein the BS comprises a first BS and a second BS, wherein the receiving is from the first BS and the communicating is with the second BS.

Aspect 22. The UE of any of aspects 16-21, wherein the transceiver is further configured to:

communicate, to the BS, a second information set associated with the UE.

Aspect 23. The UE of aspect 22, wherein the second information set comprises a same type of information as the first information set.

Aspect 24. A base station (BS) comprising:

a transceiver configured to:

receive, from a candidate cooperative user equipment (UE), a first information set associated with the candidate cooperative UE;

communicate, to a target UE, at least a portion of the first information set; and receive, from the target UE, a cooperative UE update request based on the at least a portion of the first information set.

Aspect 25. The BS of aspect 24, wherein the first information set comprises at least one of:

UE capability information of the candidate cooperative UE, UE availability information of the candidate cooperative UE, UE link status information of the candidate cooperative UE, or UE configuration information of the candidate cooperative UE.

Aspect 26. The BS of aspect 25, wherein the UE availability information comprises discontinuous reception (DRX) information of the candidate cooperative UE.

Aspect 27. The BS of any of aspects 24-26, wherein the communication comprises a broadcast signal.

Aspect 28. The BS of any of aspects 24-26, wherein the transceiver is further configured to:

receive, from the target UE, a request for at least a portion of the first information set, wherein the communication is in response to the request.

Aspect 29. The BS of any of aspects 24-28, wherein the transceiver is further configured to:

receive, from the target UE, a second information set associated with the target UE.

Aspect 30. The BS of aspect 29, wherein the second information set comprises a same type of information as the first information set.

The various illustrative blocks and modules described in connection with the disclosure herein may be implemented or performed with a general-purpose processor, a DSP, an ASIC, an FPGA or other programmable logic device, discrete gate or transistor logic, discrete hardware components, or any combination thereof designed to perform the functions described herein. A general-purpose processor may be a microprocessor, but in the alternative, the processor may be any conventional processor, controller, microcontroller, or state machine. A processor may also be implemented as a combination of computing devices (e.g., a combination of a DSP and a microprocessor, multiple microprocessors, one or more microprocessors in conjunction with a DSP core, or any other such configuration).

The functions described herein may be implemented in hardware, software executed by a processor, firmware, or any combination thereof. If implemented in software executed by a processor, the functions may be stored on or transmitted over as one or more instructions or code on a computer-readable medium. Other examples and implementations are within the scope of the disclosure and appended claims. For example, due to the nature of software, functions described above can be implemented using software executed by a processor, hardware, firmware, hardwiring, or combinations of any of these. Features implementing functions may also be physically located at various positions, including being distributed such that portions of functions are implemented at different physical locations. Also, as used herein, including in the claims, "or" as used in a list of items (for example, a list of items prefaced by a phrase such as "at least one of" or "one or more of") indicates an inclusive list such that, for example, a list of [at least one of A, B, or C] means A or B or C or AB or AC or BC or ABC (i.e., A and B and C). The terms "about" or "approximately" may be used to denote a range of +/−2%, unless specified otherwise.

As those of some skill in this art will by now appreciate and depending on the particular application at hand, many modifications, substitutions and variations can be made in and to the materials, apparatus, configurations and methods of use of the devices of the present disclosure without departing from the spirit and scope thereof. In light of this, the scope of the present disclosure should not be limited to that of the particular aspects illustrated and described herein, as they are merely by way of some examples thereof, but rather, should be fully commensurate with that of the claims appended hereafter and their functional equivalents.

What is claimed is:

1. A method of wireless communication comprising:

receiving, by a user equipment (UE) from a base station (BS), a first information set associated with a candidate cooperative UE, wherein the first information set comprises UE availability information of the candidate cooperative UE, wherein the UE availability information comprises:

discontinuous reception (DRX) information of the candidate cooperative UE, and an indication of a time slot during which the candidate cooperative UE is available for cooperation, the time slot comprising a time stamp and a window length during which the candidate cooperative UE is available for cooperation;

discovering, by the UE, the candidate cooperative UE based on the first information set;

connecting, by the UE to the candidate cooperative UE; and communicating, by the UE with the BS, through the candidate cooperative UE.

2. The method of claim 1, wherein the first information set further comprises at least one of:

UE capability information of the candidate cooperative UE, UE link status information of the candidate cooperative UE, or UE configuration information of the candidate cooperative UE.

3. The method of claim 2, wherein the UE capability information comprises one or more of: supported sidelink type, supported sidelink latency, supported Uu link, or uplink (UL) transmit power class.

4. The method of claim 1, wherein the receiving is from a broadcast signal by the BS.

5. The method of claim 1, further comprising:

communicating, by the UE to the BS, a request for the first information set, wherein the receiving of the first information set is in response to the request.

6. The method of claim 1, wherein:

the BS comprises a first BS and a second BS, and the receiving is from the first BS and the communicating is with the second BS.

7. The method of claim 1, further comprising:

communicating, by the UE to the BS, a second information set associated with the UE.

8. The method of claim 7, wherein the second information set comprises a same type of information as the first information set.

9. A method of wireless communication comprising:

receiving, by a base station (BS) from a candidate cooperative user equipment (UE), a first information set associated with the candidate cooperative UE, wherein the first information set comprises at least UE availability information of the candidate cooperative UE, wherein the UE availability information comprises:

discontinuous reception (DRX) information of the candidate cooperative UE, and an indication of a time slot during which the candidate cooperative UE is available for cooperation, the time slot comprising a time stamp and a window length during which the candidate cooperative UE is available for cooperation;

communicating, by the BS to a target UE, at least a portion of the first information set; and receiving, by the BS from the target UE, a cooperative UE update request based on the at least a portion of the first information set.

10. The method of claim 9, wherein the first information set further comprises at least one of:

UE capability information of the candidate cooperative UE, UE link status information of the candidate cooperative UE, or UE configuration information of the candidate cooperative UE.

11. The method of claim 10, wherein the UE capability information comprises one or more of: supported sidelink type, supported sidelink latency, supported Uu link, or uplink (UL) transmit power class.

12. The method of claim 9, wherein the communicating comprising broadcasting by the BS.

13. The method of claim 9, further comprising:

receiving, from the target UE, a request for at least a portion of the first information set, wherein the communicating is in response to the request.

14. The method of claim 9, further comprising:

receiving, by the BS from the target UE, a second information set associated with the target UE.

15. The method of claim 14, wherein the second information set comprises a same type of information as the first information set.

16. A user equipment (UE) comprising:

a transceiver configured to:

receive, from a base station (BS), a first information set associated with a candidate cooperative UE, wherein the first information set comprises UE availability information of the candidate cooperative UE, wherein the UE availability information comprises:

discontinuous reception (DRX) information of the candidate cooperative UE, and an indication of a time slot during which the candidate cooperative UE is available for cooperation, the time slot comprising a time stamp and a window length during which the candidate cooperative UE is available for cooperation; and a processor configured to:

discover the candidate cooperative UE based on the first information set; and connect to the candidate cooperative UE, wherein the transceiver is further configured to communicate with the BS through the candidate cooperative UE.

17. The UE of claim 16, wherein the first information set further comprises at least one of:

UE capability information of the candidate cooperative UE, UE link status information of the candidate cooperative UE, or UE configuration information of the candidate cooperative UE.

18. The UE of claim 17, wherein the UE capability information comprises one or more of: supported sidelink type, supported sidelink latency, supported Uu link, or uplink (UL) transmit power class.

19. The UE of claim 16, wherein, to receive the first information set associated with a candidate cooperative UE, the transceiver is configured to receive the first information set from a broadcast signal by the BS.

20. The UE of claim 16, wherein:

the transceiver is further configured to communicate, to the BS, a request for the first information set, and to receive the first information set associated with a candidate cooperative UE, the transceiver is configured to receive the first information set in response to the request.

21. The UE of claim 16, wherein the BS comprises a first BS and a second BS, wherein the receiving is from the first BS and the communicating is with the second BS.

22. The UE of claim 16, wherein the transceiver is further configured to:

communicate, to the BS, a second information set associated with the UE.

23. The UE of claim 22, wherein the second information set comprises a same type of information as the first information set.

24. A base station (BS) comprising:

a transceiver configured to:

receive, from a candidate cooperative user equipment (UE), a first information set associated with the candidate cooperative UE, wherein the first information set comprises UE availability information of the candidate cooperative UE, wherein the UE availability information comprises:

discontinuous reception (DRX) information of the candidate cooperative UE, and an indication of a time slot during which the candidate cooperative UE is available for cooperation, the time slot comprising a time stamp and a window length during which the candidate cooperative UE is available for cooperation;

communicate, to a target UE, at least a portion of the first information set; and receive, from the target UE, a cooperative UE update request based on the at least a portion of the first information set.

25. The BS of claim 24, wherein the first information set comprises at least one of:

UE capability information of the candidate cooperative UE, UE link status information of the candidate cooperative UE, or UE configuration information of the candidate cooperative UE.

26. The BS of claim 25, wherein the UE capability information comprises one or more of: supported sidelink type, supported sidelink latency, supported Uu link, or uplink (UL) transmit power class.

27. The BS of claim 24, wherein the communication comprises a broadcast signal.

28. The BS of claim 24, wherein the transceiver is further configured to:

receive, from the target UE, a request for at least a portion of the first information set, wherein the communication is in response to the request.

29. The BS of claim 24, wherein the transceiver is further configured to:

receive, from the target UE, a second information set associated with the target UE.

30. The BS of claim 29, wherein the second information set comprises a same type of information as the first information set.

* * * * *